United States Patent
Miyabayashi et al.

(10) Patent No.: US 8,959,170 B2
(45) Date of Patent: Feb. 17, 2015

(54) COMMUNICATION METHOD, INFORMATION PROCESSING APPARATUS, AND RECORDING MEDIUM RECORDING COMPUTER READABLE PROGRAM

(75) Inventors: Naoki Miyabayashi, Tokyo (JP);
Yoshihiro Yoneda, Tokyo (JP);
Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 761 days.

(21) Appl. No.: 12/779,265

(22) Filed: May 13, 2010

(65) Prior Publication Data

US 2010/0312849 A1 Dec. 9, 2010

(30) Foreign Application Priority Data

Jun. 9, 2009 (JP) ................................ P2009-138593

(51) Int. Cl.
*G06F 15/16* (2006.01)
*H04W 84/20* (2009.01)
(52) U.S. Cl.
CPC ..................................... *H04W 84/20* (2013.01)
USPC ........................................................ 709/209
(58) Field of Classification Search
CPC .................................................... H04W 84/20
USPC ......................................................... 709/209
See application file for complete search history.

(56) References Cited

U.S. PATENT DOCUMENTS

| | | | | |
|---|---|---|---|---|
| 5,526,358 A * | 6/1996 | Gregerson et al. | ............ | 709/221 |
| 5,699,351 A * | 12/1997 | Gregerson et al. | ............ | 370/256 |
| 5,793,968 A * | 8/1998 | Gregerson et al. | ............ | 709/209 |
| 6,209,039 B1 * | 3/2001 | Albright et al. | ................ | 709/249 |
| 6,597,956 B1 * | 7/2003 | Aziz et al. | .......................... | 700/3 |
| 6,735,630 B1 * | 5/2004 | Gelvin et al. | .................. | 709/224 |
| 6,826,607 B1 * | 11/2004 | Gelvin et al. | .................. | 709/224 |
| 6,832,251 B1 * | 12/2004 | Gelvin et al. | .................. | 709/224 |
| 6,859,831 B1 * | 2/2005 | Gelvin et al. | .................. | 709/224 |
| 6,876,643 B1 * | 4/2005 | Aggarwal et al. | ............. | 370/338 |
| 6,879,570 B1 * | 4/2005 | Choi | ............................. | 370/329 |
| 7,020,701 B1 * | 3/2006 | Gelvin et al. | .................. | 709/224 |
| 7,606,868 B1 * | 10/2009 | Le et al. | ........................ | 709/211 |
| 7,783,879 B2 * | 8/2010 | Krummel et al. | ............. | 713/151 |

(Continued)

FOREIGN PATENT DOCUMENTS

JP 2005-117656 4/2005

*Primary Examiner* — Rupal Dharia
*Assistant Examiner* — Marcus McKenzie
(74) *Attorney, Agent, or Firm* — K&L Gates LLP

(57) ABSTRACT

A communication method includes: a first transmission step of transmitting first setting information and first network organization information regarding one information processing apparatus of a second network via a first communication path; a first determination step of determining a role of communication with a first master apparatus via a second communication path on the basis of the first network organization information and role adjustment information; a second transmission step of transmitting second setting information and second network organization information to the first master apparatus via the first communication path; a second determination step of determining a role of the communication with a second master apparatus via the second communication path on the basis of the second network organization information and role adjustment information by the first master apparatus; and a first communication start step of starting the communication via the second communication path with another information processing apparatus.

11 Claims, 18 Drawing Sheets

(56) References Cited

U.S. PATENT DOCUMENTS

| | | | |
|---|---|---|---|
| 7,797,367 B1* | 9/2010 | Gelvin et al. | 709/200 |
| 7,844,687 B1* | 11/2010 | Gelvin et al. | 709/220 |
| 2002/0044549 A1* | 4/2002 | Johansson et al. | 370/386 |
| 2003/0060222 A1* | 3/2003 | Rune | 455/517 |
| 2004/0077313 A1* | 4/2004 | Oba et al. | 455/41.2 |
| 2004/0147267 A1* | 7/2004 | Hill et al. | 455/456.1 |
| 2004/0198358 A1* | 10/2004 | Kim et al. | 455/436 |
| 2004/0242250 A1* | 12/2004 | Sasai et al. | 455/502 |
| 2004/0247023 A1* | 12/2004 | Sasai et al. | 375/220 |
| 2005/0188103 A1* | 8/2005 | Chen | 709/238 |
| 2006/0128402 A1* | 6/2006 | Lee et al. | 455/464 |
| 2007/0016663 A1* | 1/2007 | Weis | 709/223 |
| 2007/0082732 A1* | 4/2007 | Krummel et al. | 463/29 |
| 2008/0013502 A1* | 1/2008 | Clark | 370/338 |
| 2009/0180460 A1* | 7/2009 | Chang et al. | 370/345 |
| 2010/0061299 A1* | 3/2010 | Kennedy et al. | 370/328 |
| 2010/0148940 A1* | 6/2010 | Gelvin et al. | 340/286.02 |
| 2010/0201516 A1* | 8/2010 | Gelvin et al. | 340/539.26 |
| 2011/0035491 A1* | 2/2011 | Gelvin et al. | 709/224 |

* cited by examiner

FIRST COMMUNICATION PATH

FIG. 6

| TARGET APPARATUS \ INFORMATION PROCESSING APPARATUS | MASTER | ANY |
|---|---|---|
| MASTER | APPARATUS WITH MORE EXTERNAL APPARATUSES IS MASTER | INFORMATION PROCESSING APPARATUS: SLAVE<br><br>TARGET APPARATUS: MASTER |
| ANY | INFORMATION PROCESSING APPARATUS: MASTER<br><br>TARGET APPARATUS: SLAVE | APPARATUS WITH MORE EXTERNAL APPARATUSES IS MASTER |

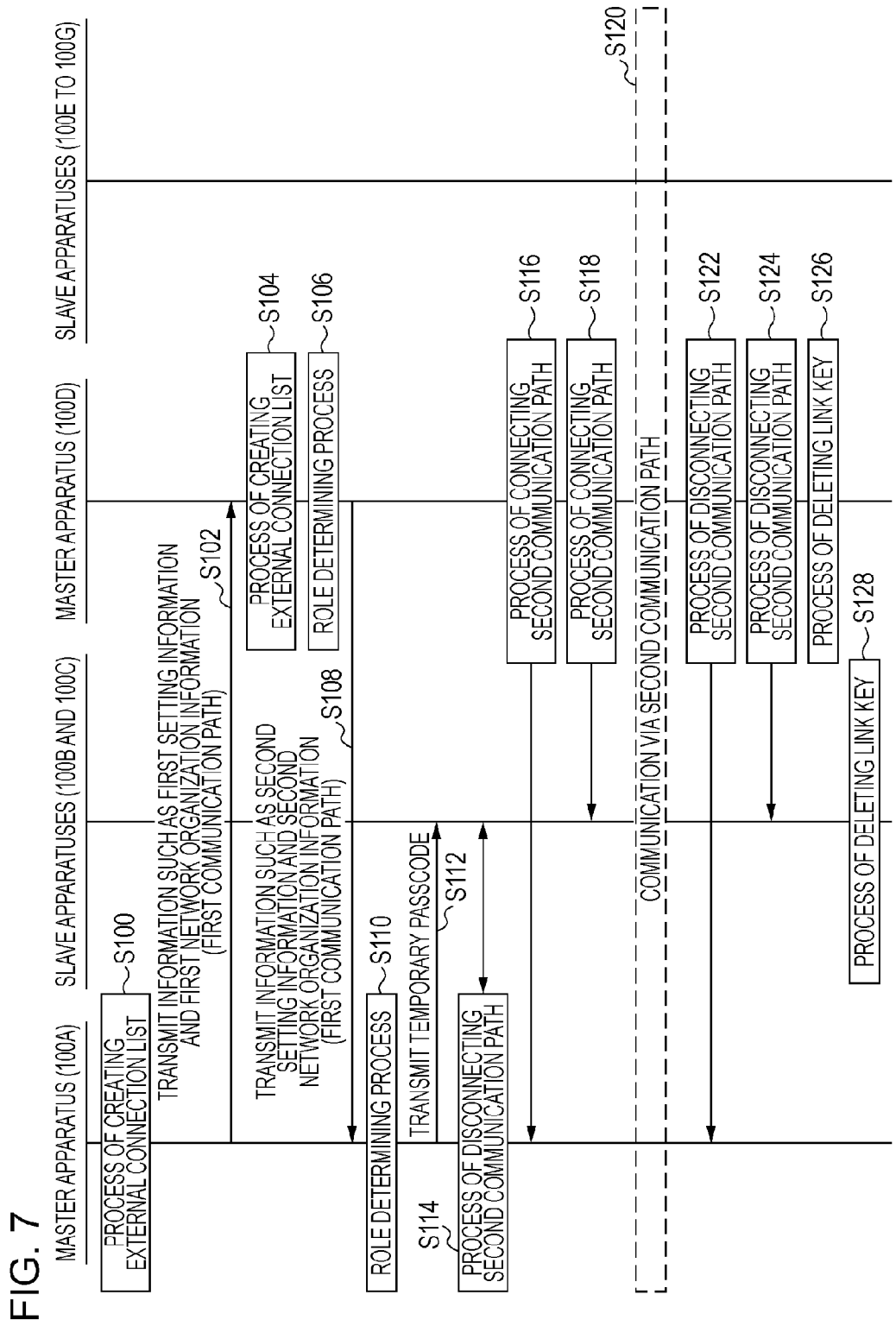

FIG. 9A

|  | BD ADDRESS |
|---|---|
| 100B | 00:11:22:33:44:55 |
| 100C | 66:77:88:99:AA:BB |

FIG. 9B

| TEMPORARY PASSCODE (RANDOM NUMBER) | 15486312545231 |
|---|---|

FIG. 10A

|  | BD ADDRESS |
|---|---|
| 100E | FF:EE:DD:CC:BB |
| 100F | AA:99:88:77:66:55 |
| 100G | 44:33:22:11:00:FF |

FIG. 10B

| TEMPORARY PASSCODE (RANDOM NUMBER) | 3621548623 |
|---|---|

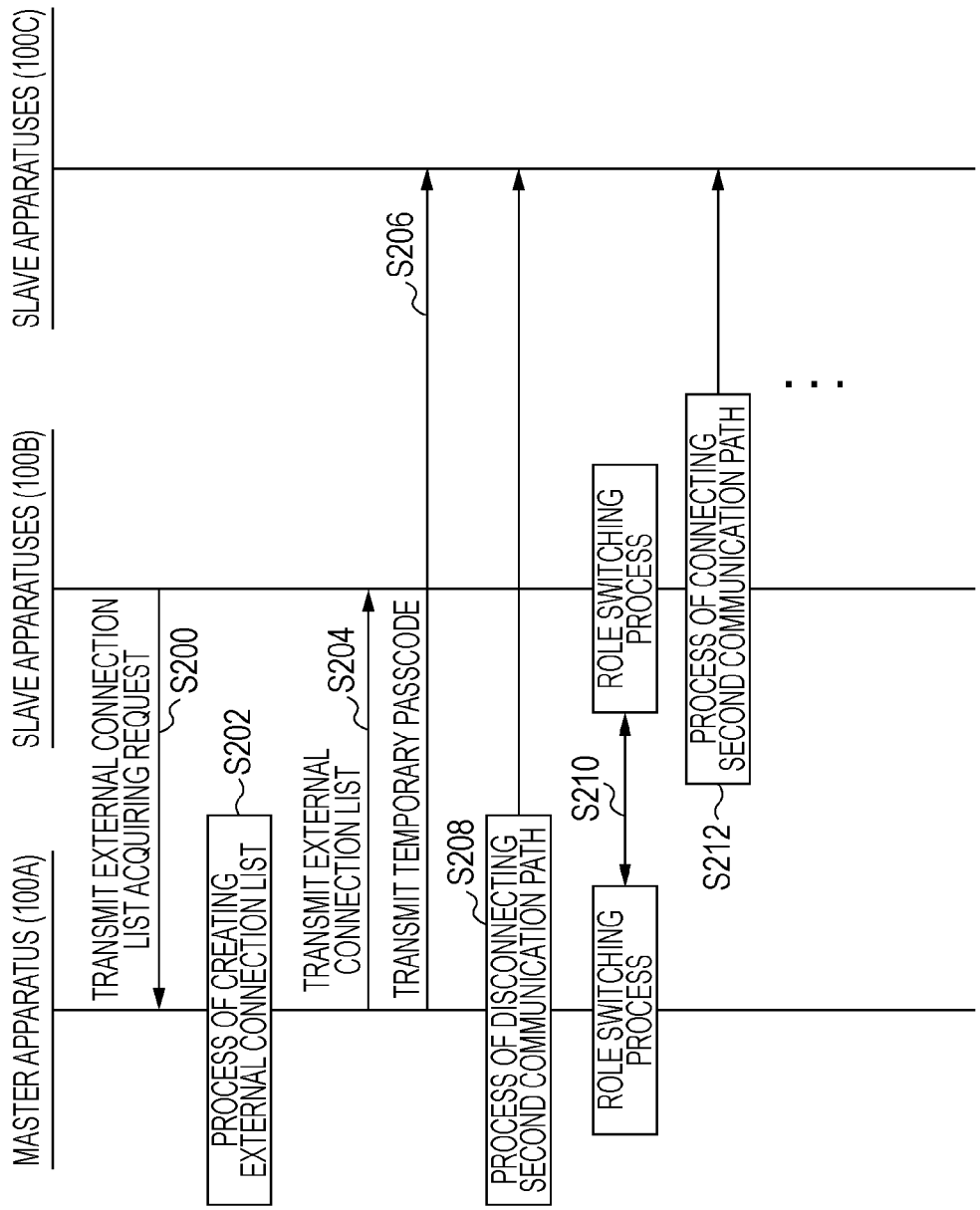

FIRST COMMUNICATION PATH

FIG. 15A

|  | BD ADDRESS |
|---|---|
| 100D | 00:11:22:33:44:55 |
| 100F | 66:77:88:99:AA:BB |
| 100G | CC:DD:EE:FF:00:11 |

FIG. 15B

| TEMPORARY PASSCODE (RANDOM NUMBER) | 622115428521485F |
|---|---|

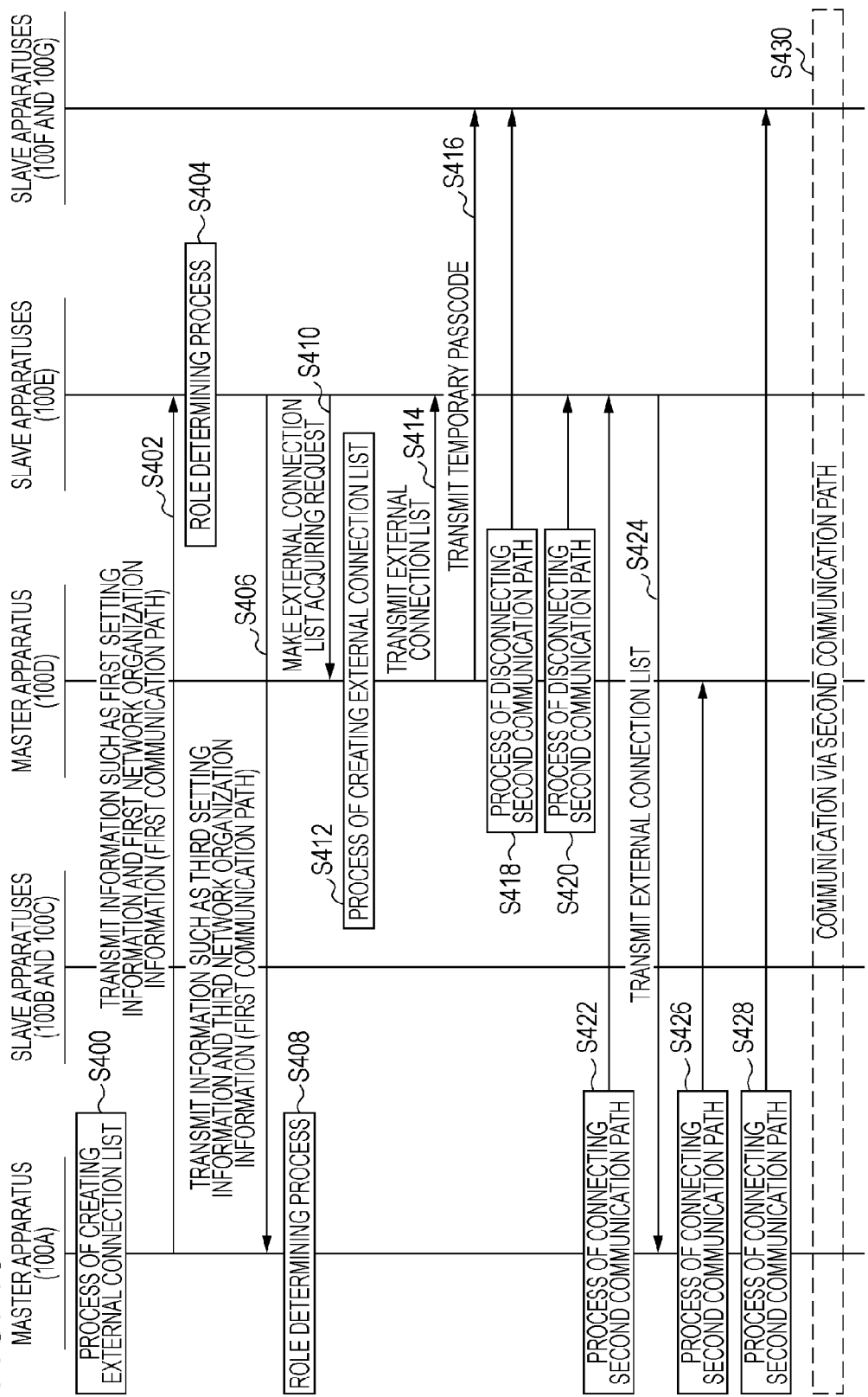

COMMUNICATION METHOD, INFORMATION PROCESSING APPARATUS, AND RECORDING MEDIUM RECORDING COMPUTER READABLE PROGRAM

CROSS REFERENCES TO RELATED APPLICATIONS

The present application claims priority to Japanese Priority Patent Application JP 2009-138593 filed in the Japan Patent Office on Jun. 9, 2009, the entire content of which is hereby incorporated by reference.

BACKGROUND

The present application relates to a communication method, an information processing apparatus, and a recording medium recording a computer readable program.

In recent years, there have been widely used information processing apparatuses carrying out wireless communication using a frequency hopping spread spectrum such as IEEE 802.15.1 (also called "Bluetooth" (registered trademark)). For example, when a communication technology of the frequency hopping spread spectrum such as IEEE 802.15.1 is used, communication can be carried out in the range in which radio waves arrive, even in a case where an obstacle is present between apparatuses. For example, IEEE 802.15.1 or the like is used for communication between a cellular phone (which is an example of the information processing apparatus) and a headset (which is an example of the information processing apparatus) to realize hands-free conversation or for communication between a PC (Personal Computer, which is an example of the information processing apparatus) and an operation device such as a keyboard. Moreover, when the communication technology of frequency hopping spread spectrum such as IEEE 802.15.1 is used, power consumption for communication between information processing apparatuses can be reduced, compared to a case where another communication technology is used. Thanks to these advantages, there have been widely used the information processing apparatuses capable of carrying out wireless communication using the communication technology such as the frequency hopping spread spectrum such as IEEE 802.15.1.

In the wireless communication network where the plurality of information processing apparatuses described above are used, one information processing apparatus organizing the wireless communication network serves as a master apparatus and the other information processing apparatuses serve as slave apparatuses to carry out wireless communication. Here, the master apparatus refers to an information processing apparatus that is in charge of determining a frequency hopping pattern related to communication in the wireless communication network, for example. The slave apparatus refers to an information processing apparatus that makes synchronization of the frequency hopping pattern determined by the master apparatus to carry out communication in the wireless communication network or the like. For example, as illustrated in FIG. 1, a star-type wireless communication network N10 is realized by a plurality of information processing apparatuses in such a manner that one information processing apparatus of the plurality of information processing apparatuses serves as the master apparatus and the other information processing apparatuses serve as the slave apparatuses, as described above. FIG. 1 is an explanatory diagram illustrating an example of a star-type wireless communication network. FIG. 1 shows an example of the wireless communication network in which an information processing apparatus 10A serves as the master apparatus. Information processing apparatuses 10B to 10D serve as the slave apparatuses.

A technology has been developed to add a new information processing apparatus as an information processing apparatus organizing a wireless communication network to the wireless communication network. For example, Japanese Unexamined Patent Application Publication No. 2005-117656 discloses a technology capable of selectively adding the information processing apparatus as an information processing apparatus organizing the wireless communication network by authenticating the newly added information processing apparatus by use of a multi-hop technology.

SUMMARY

In recent years, multi functions have been realized in the information processing apparatus capable of carrying out wireless communication by use of a communication technology of the frequency hopping spread spectrum such as IEEE 802.15.1. A certain information processing apparatus has been developed to realize an entertainment function such as a game using wireless communication as well as the basic functions of the information processing apparatus. An example of the information processing apparatus includes a mobile phone capable of realizing a game using wireless communication as well as the basic functions such as calling or mailing.

In FIG. 1, when the plurality of information processing apparatuses 10A to 10D (hereinafter, also generally referred to as "information processing apparatuses 10") organize one star-type wireless communication network (hereinafter, also referred to as a "star-type network" or a "network") N10, the information processing apparatuses 10 can carry out communication through the master apparatus 10A.

By constructing a network (hereinafter, referred to as a "scatternet") formed by connection of a plurality of networks, communication can be carried out between information processing apparatuses belonging to other networks. FIG. 2 is an explanatory diagram illustrating an example of the scatternet. FIG. 2 shows an example where a network N11 organized by the information processing apparatuses 10A and 10D and a network N12 organized by the information processing apparatuses 10B and 10C are connected to each other by a network N13 organized by the information processing apparatuses 10A and 10C. In FIG. 2, the information processing apparatus 10A serves as a master apparatus of the networks N11 and N13. The information processing apparatus 10C serves as a master apparatus of the network N12. By constructing the scatternet illustrated in FIG. 2, communication can be realized between the information processing apparatuses 10B and 10D illustrated in FIG. 2, for example, that is, the information processing apparatuses belonging to other networks.

However, when the communication is realized between the information processing apparatuses by the construction of the scatternet, it is necessary to provide the information processing apparatuses, such as the information processing apparatuses 10A and 10C illustrated in FIG. 2, performing processes related to the communication of the plurality of networks. Therefore, when the communication is realized between the information processing apparatuses belonging to the other networks by the construction of the scatternet, excessive load may be put on some of the information processing apparatuses organizing the scatternet. For this reason, unintended communication failure may occur due to a reduction in throughput or communication disconnection caused by overload.

When packets are transmitted from one information processing apparatus in a scatternet to any information processing apparatus in the case of the communication between the information processing apparatuses by the construction of the scatternet, the transmission paths of the packets become complex with an increase in the number of networks in the scatternet. More specifically, the combinations of the transmission paths increase in an exponential manner with the increase in the number of networks in the scatternet. Therefore, since the processes related to the communication between the information processing apparatuses in the scatternet become complex with the increase in the number of networks, unintended communication failure may occur due to a reduction in throughput or communication disconnection caused by overload.

When the communication is carried out between the information processing apparatuses by the construction of the scatternet, unintended communication failure may occur. Therefore, stability of the communication may not be achieved. In view of the complexity of the processes related to the communication, it is difficult to realize application software (hereinafter, referred to as an "application"), for example, such as a game using wireless communication, using the communication between the information processing apparatuses in the scatternet. Therefore, it is necessary to provide a new communication method capable of carrying more stable communication between information processing apparatuses belonging to different star-type networks without constructing the scatternet, and to provide an information processing apparatus realizing the new communication method.

An information processing apparatus trying connection to a network in a technology according to a known example (hereinafter, "a technology according to a known example), in which a new information processing apparatus is added as an information processing apparatus organizing the network to the network, carries out communication with a proxy authentication apparatus organizing the network. In the technology according to the known example, the proxy authentication apparatus authenticates the information processing apparatus trying connection to the network by performing authentication with a master authentication apparatus in the network. Therefore, in the technology according to the known example, a new information processing apparatus can be added selectively to the network.

In the technology according to the known example, the authentication of the information processing apparatus trying the connection to the network is performed between the proxy apparatus and the master authentication apparatus organizing the network. For this reason, even when the information processing apparatus trying the connection to the network is an information processing apparatus that does not belong to the network but belongs to another network, the information processing apparatus trying the connection to the network is just added to the network. That is, even when the technology according to the known example is used, the plurality of networks is connected to each other via the information processing apparatus trying the connection. Therefore, the result of the scatternet in FIG. 2 may just be obtained.

Even when the technology according to the known example is used, unintended communication failure may occur as in the scatternet. For this reason, the stability of the communication may not be achieved. Moreover, even when the technology according to the known example is used, an application, such as a game using wireless communication, operating on the networks, operating on the network and using wireless communication between the information processing apparatuses organizing other networks may not be realized, as in the scatternet.

It is desirable to provide a new improved communication method, an information processing apparatus, and a recording medium recording a computer readable program capable of carrying out more stable communication between information processing apparatuses belonging to other star-type networks by integrating the plurality of star-type networks into one star-type network.

According to an embodiment, there is provided a communication method between a first network, which is organized by a plurality of information processing apparatuses each including a first communication unit carrying out non-contact type communication with an external apparatus via a first communication path using carrier waves with a predetermined frequency and a second communication unit carrying out communication with an external apparatus via a second communication path different from the first communication path, and in which one information processing apparatus of the plurality of information processing apparatuses serves as a first master apparatus playing a role of a master in the communication via the second communication path and the other information processing apparatuses serve as first slave apparatuses playing a role of a slave, and a second network having the same configuration as that of the first network. The communication method includes: a first transmission step of transmitting first setting information used for the external apparatus to carry out the communication with the first master apparatus via the second communication path and first network organization information regarding the organization of the first network from the first master apparatus of the first network to one information processing apparatus of the second network via the first communication path; a first determination step of determining a role of the communication with the first master apparatus via the second communication path by the second master apparatus on the basis of the received first network organization information and role adjustment information used to determine the role of the communication via the second communication path, when the information processing apparatus receiving the first setting information and the first network organization information transmitted in the first transmission step is a second master apparatus playing a role of a master in the second network; a second transmission step of transmitting second setting information used for the external apparatus to carry out the communication with the second master apparatus via the second communication path and second network organization information regarding the organization of the second network from the second master apparatus to the first master apparatus via the first communication path; a second determination step of determining a role of the communication with the second master apparatus via the second communication path by the first master apparatus on the basis of the received second network organization information and role adjustment information used to determine the role of the communication via the second communication path; and a first communication start step of starting the communication via the second communication path by one information processing apparatus of the first and second master apparatuses determined to play the role of the master in the first or second determination step with another information processing apparatus organizing the network, to which the other information processing apparatus determined to play the role of the slave in the first or second determination step belongs, on the basis of the first setting information and the first network organization information or on the basis of the second setting information and the second network organization information.

By using the communication method to integrate the plurality of star-type networks into one star-type network, it is possible to realize more stable communication between the information processing apparatuses belonging to the different networks.

The communication method may further include a first disconnection step of disconnecting the communication via the second communication path with the slave apparatuses organizing the network, to which the other information processing apparatus determined to play the role of the slave in the first or second determination step belongs, by the other information processing apparatus.

The communication method may further include: a third transmission step of transmitting third setting information, which is used for an external apparatus to carry out the communication via the second communication path with a second slave apparatus playing the role of the slave in the second network and receiving the first setting information and the first network organization information, and third network organization information, which includes notification information indicating transmission of an external connection list including setting information used to carry out the communication via the second communication path with the information processing apparatuses organizing the second network other than the second slave apparatus receiving the first setting information and the first network organization information, via the first communication path, when the information processing apparatus receiving the first setting information and the first network organization information transmitted in the first transmission step is the second slave apparatus playing the role of the slave in the second network; a first acquiring request transmission step of transmitting an acquiring request requesting transmission of the external connection list from the second slave apparatus receiving the first setting information and the first network organization information to the second master apparatus via the second communication path; a fourth transmission step of transmitting the external connection list in reply to the acquired request from the second master apparatus to the second slave apparatus transmitting the acquiring request via the second communication path on the basis of the acquiring request transmitted in the first acquiring request transmission step; a fifth transmission step of transmitting the external connection list acquired from the second master apparatus in the first acquiring request transmission step from the second slave apparatus to the first master apparatus via the second communication path; and a second communication start step of starting the communication via the second communication path with the information processing apparatuses organizing the second network by the first master apparatus on the basis of the third setting information transmitted in the third transmission step and the external connection list transmitted in the fifth transmission step.

The communication method may further include a role switch step of switching the roles of the master apparatus and the slave apparatus among the plurality of the information processing apparatuses organizing the first network. The master transmitting the first setting information and the first network organization information via the first communication path in the first transmission step may be the information processing apparatus of which the role is switched in the role switch step.

The role switch step may includes: a second acquiring request transmission step of transmitting an acquiring request requesting transmission of an external connection list including setting information used to carry out communication with the information processing apparatuses organizing the first network other than the first slave apparatus from one slave apparatus playing the role of the slave among the information processing apparatuses organizing the first network to the master apparatus playing the role of the master in the first network via the second communication path; a sixth transmission step of transmitting the external connection list in reply to the acquiring request from the master apparatus to the first slave apparatus transmitting the acquiring request via the second communication path on the basis of the acquiring request transmitted in the second acquiring request transmission step; a second disconnection step of disconnecting the communication via the second communication path with the slave apparatuses organizing the first network other than the first slave apparatus transmitting the acquiring request by the master apparatus transmitting the external connection list in the sixth transmission step; and a role switch step of switching the role of the first slave apparatus transmitting the acquiring request to the role of the master and switching the role of the master disconnecting the communication in the second disconnection step to the role of the slave.

The third network information may include a header representing a kind of information, designation role information representing a requested role in the communication via the second communication path, and the notification information.

The communication method may further include: a third acquiring request transmission step of transmitting an acquiring request, which requests transmission of an external connection list including setting information used to carry out communication with the information processing apparatuses organizing the second network other than a second slave apparatus playing the role of the slave of the second network and receiving the first setting information and the first network organization information, from the second slave apparatus receiving the first setting information and the first network organization information to the second master apparatus via the second communication path, when the information processing apparatus receiving the first setting information and the first network organization information transmitted in the first transmission step is the second slave apparatus playing the role of the slave in the second network; a seventh transmission step of transmitting the external connection list in reply to the acquiring request from the second master apparatus to the second slave apparatus transmitting the acquiring request via the second communication path on the basis of the acquiring request transmitted in the third acquiring request transmission step; an eighth transmission step of transmitting second network organization information, which includes the external connection list acquired from the second master apparatus in the third acquiring request transmission step, and third setting information, which is used for an external apparatus to carry out communication with the second slave apparatus receiving the first setting information and the first network organization information via the second communication path, from the second slave apparatus receiving the first setting information and the first network organization information transmitted in the first transmission step to the first master apparatus via the second communication path; and a third communication start step of starting the communication via the second communication path with the information processing apparatuses organizing the second network by the first master apparatus receiving the third setting information and the second network organization information transmitted in the eight transmission step on the basis of the received third setting information and second network organization information.

The communication method may further include a third disconnection step of disconnecting the communication via the second communication path with the slave apparatuses organizing the second network by the second master apparatus transmitting the external connection list in the seventh transmission step.

The first network organization information and the second network organization information may each include a header representing the kind of information, designation role information representing the requested role in the communication via the second communication path, and an external connection list including setting information used for an external apparatus to carry out communication with the information processing apparatuses organizing the network other than the information processing apparatus transmitting the first network organization information or the second network organization information.

The external connection list may further include authentication information used for authentication upon carrying out communication with the information processing apparatuses organizing the first network or the information processing apparatuses organizing the second network.

The authentication information may be unique information of the first and second networks or unique information of each of the information processing apparatuses organizing the first network and each of the information processing apparatuses organizing the second network.

According to another embodiment, there is provided an information processing apparatus including: a first communication unit that carries out non-contact type communication with an external apparatus via a first communication path using carrier waves with a predetermined frequency; a second communication unit that carries out communication with an external apparatus via a second communication path different from the first communication path; a communication controller that controls each of the communications via the first communication path and the communication via the second communication path; and a role controller that determines a role in the communication via the second communication path with an external apparatus belonging to an external network organized by a plurality of the external apparatuses connected via the second communication path on the basis of network organization information regarding configuration of the external network, the network organization information being transmitted from one external apparatus belonging to the external network and received by the first communication unit, and role adjustment information used to determine the role in the communication via the second communication path. The communication controller permits active communication via the second communication path with each of the external apparatuses organizing the external network, the communication controller is determined to play a role of a master of the communication via the second communication path by the role controller. The communication controller permits passive communication via the second communication path with the one external apparatus, the communication controller is determined to play a role of a slave of the communication via the second communication path by the role controller.

With such a configuration, by integrating the plurality of star-type networks into one star-type network, it is possible to realize more stable communication between the information processing apparatuses belonging to the different networks.

According to still another embodiment, there is provided a recording medium recording a computer readable program causing a computer to function as: means for carrying out non-contact type communication with an external apparatus via a first communication path using carrier waves with a predetermined frequency; means for carrying out communication with an external apparatus via a second communication path different from the first communication path; control means for controlling each of the communications via the first communication path and the communication via the second communication path; and determination means for determining a role in the communication via the second communication path with an external apparatus belonging to an external network organized by a plurality of the external apparatuses connected via the second communication path on the basis of network organization information regarding configuration of the external network, the network organization information being transmitted from one external apparatus belonging to the external network and received by the first communication unit, and role adjustment information used to determine the role in the communication via the second communication path. The control means permits active communication via the second communication path with each of the external apparatuses organizing the external network, when the control means is determined to play a role of a master of the communication via the second communication path by the determination means. The control means permits passive communication via the second communication path with the one external apparatus, when the control means is determined to play a role of a slave of the communication via the second communication path by the determination means.

By using the recording medium recording a computer readable program to integrate the plurality of star-type networks into one star-type network, it is possible to realize more stable communication between the information processing apparatuses belonging to the different networks.

According to the an embodiment, it is possible to carry out more stable communication between the information processing apparatuses belonging to the different star-type networks by integrating the plurality of star-type networks into one star-type network.

Additional features and advantages are described herein, and will be apparent from the following Detailed Description and the figures.

BRIEF DESCRIPTION OF THE FIGURES

FIG. 6 is an explanatory diagram illustrating an example of role adjustment information that is used in a roll determining process by an information processing apparatus.

FIG. 7 is an explanatory diagram illustrating a first example of a process (communication method) related to the communication stabilization approach according to an embodiment.

FIG. 9A is an explanatory diagram illustrating an example of the external connection list according to an embodiment.

FIG. 9B is an explanatory diagram illustrating an example of the external connection list according to an embodiment.

FIG. 10A is an explanatory diagram illustrating an example of the external connection list according to an embodiment.

FIG. 10B is an explanatory diagram illustrating an example of the external connection list according to an embodiment.

FIG. 11 is an explanatory diagram illustrating a second example of the process (communication method) related to the communication stabilization approach according to an embodiment.

FIG. 15A is an explanatory diagram illustrating an example of the external connection list according to an embodiment.

FIG. 15B is an explanatory diagram illustrating an example of the external connection list according to an embodiment.

FIG. 16 is an explanatory diagram illustrating a fourth example of the process (communication method) related to the communication stabilization approach according to an embodiment.

DETAILED DESCRIPTION

Figure 1:
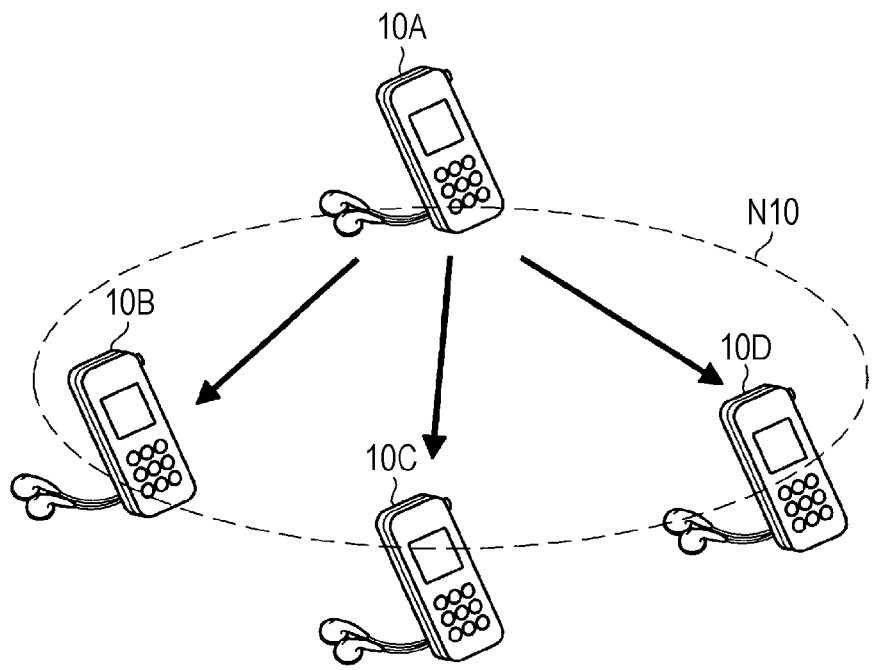
FIG. 1 is an explanatory diagram illustrating an example of a star-type wireless communication network.

The present application will be described with reference to the accompanying drawings according to an embodiment. In the specification and drawings, the same reference numerals are given to constituent elements having substantially the same function and the repeated description is omitted.

The description will be made below in the following order.
1. Communication Method according to Embodiment
2. Information Processing Apparatus according to Embodiment
3. Recording Medium Recording Computer Readable Program according to Embodiment Communication Method According to Embodiment A communication method according to an embodiment will be described before an information processing apparatus according to the embodiment is described.

Communication Stabilization Approach According to Embodiment

As described above, the communication can be carried out between the information processing apparatuses belonging to other networks in a scatternet in which the plurality of star-type networks is connected to each other. However, unintended communication failure may occur and thus processes related to the communication may become complex. Even when the technology according to the known example is used, unintended communication failure may occur as in the scatternet. Therefore, the processes related to the communication may become complex.

In an embodiment, the plurality of star-type networks is integrated into one star-type network. Here, by integrating the plurality of star-type networks into one star-type network, the communication between the information processing apparatuses belonging to the other networks before the integration is the same as the communication in the state illustrated in FIG. 1. In view of the above-described circumstance, according to the embodiment, it is possible to stabilize the communication between any of the information processing apparatuses organizing the integrated network, as well as the communication between the information processing apparatus belonging to other star-type networks, by integrating the plurality of star-type networks into one star-type network.

An example of the star-type network according to an embodiment includes a star-type network in which a plurality of information processing apparatuses are connected to each other using a communication technology of a frequency hopping spread spectrum such as IEEE 802.15.1. Hereinafter, communication such as communication using IEEE 802.15.1 between the information processing apparatuses in the star-type network will be described according to an embodiment. However, the communication between the information processing apparatuses in the network according to an embodiment is not limited to the above-described communication. For example, in the start-type network according to an embodiment, communication may be carried out between the information processing apparatuses by any communication in which a star-type network can be realized by the frequency hopping spread spectrum. Hereinafter, IEEE 802.15.1 is also referred to as "BT".

Figure 2:
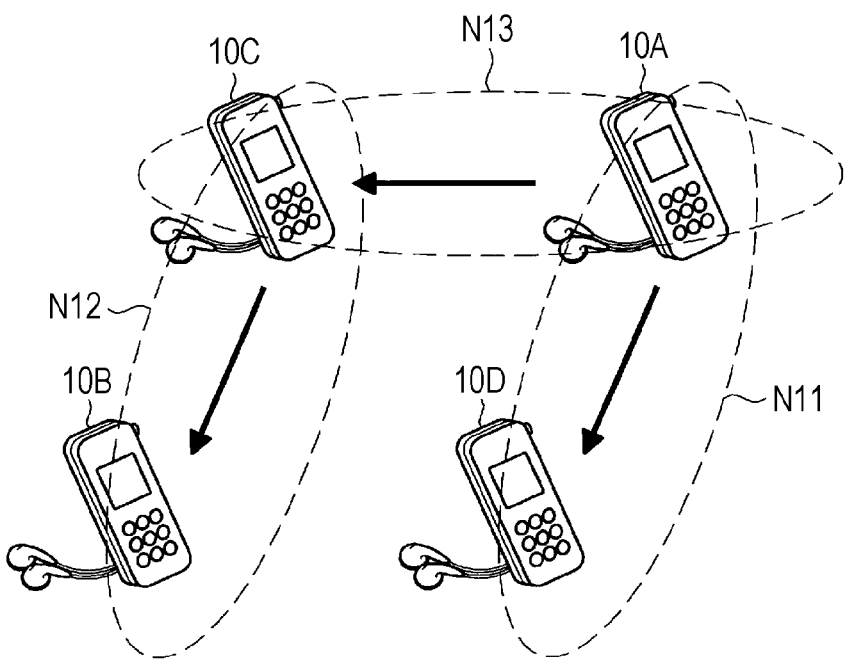
FIG. 2 is an explanatory diagram illustrating an example of a scatternet.

The communication between any of the information processing apparatuses organizing the network formed by integrating the plurality of star-type networks into one star-type network is carried out via a master apparatus, for example, as illustrated in FIG. 1. That is, in the integrated network, there is no information processing apparatus that has to perform the processes related to the communication carried out in the plurality of networks, as in the scatternet illustrated in FIG. 2 or the technology according to the known example. Therefore, in the integrated network according to the embodiment, the possibility that unintended communication failure occurs can be further reduced, compared to the case of the scatternet.

In an embodiment, combinations of transmission paths of packets are not increased in an exponential manner, as in the scatternet, since the plurality of star-type networks are integrated into one star-type network. Accordingly, since the complexity of the processes related to the communication is reduced, compared to the case of the scatternet, in the integrated network according to an embodiment, the possibility that unintended communication failure occurs can be further reduced, compared to the case of the scatternet. Moreover, by reducing the complexity of the processes related to the communication, it is possible to more easily realize an application, such as a game using wireless communication, operating on the network and using communication between the information processing apparatuses.

By using the communication stabilization approach according to the embodiment, it is possible to reduce the possibility that unintended communication failure occurs. Therefore, it is possible to carry out more stable communication between any of the information processing apparatuses, as well as the communication between the information processing apparatuses belonging to different star-type networks.

Overview of Process Related to Communication Stabilization Approach

Next, the overview of a process related to the communication stabilization approach will be described according to an embodiment. Hereinafter, it will be described about the overview of the process related to the communication stabilization approach according to the embodiment by exemplifying a case where two star-type networks are integrated into one star-type network. However, the number of star-type networks integrated using the communication stabilization approach according to an embodiment is not limited to two. For example, by repeating the process of integrating two star-type networks into one star-type network, three or more star-type networks may be integrated into one star-type network.

Figure 3A:
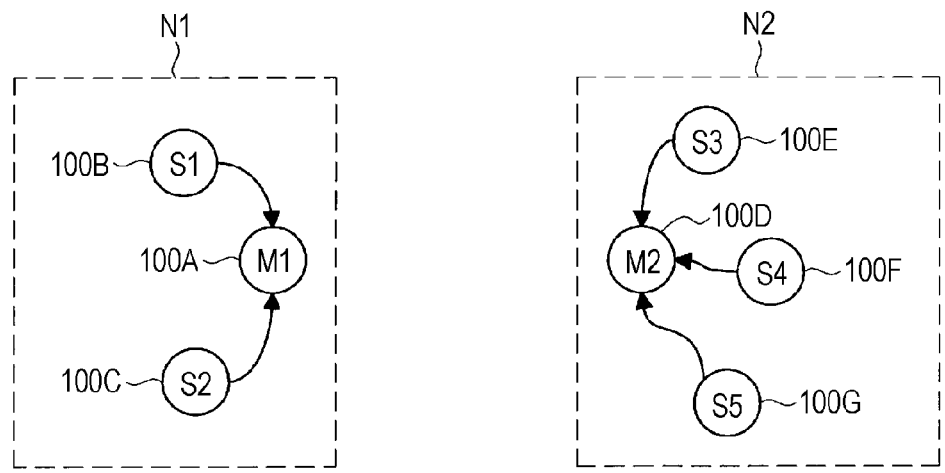
FIG. 3A is an explanatory diagram illustrating an overview of processes related to communication stabilization approach according to an embodiment.
Figure 3B:
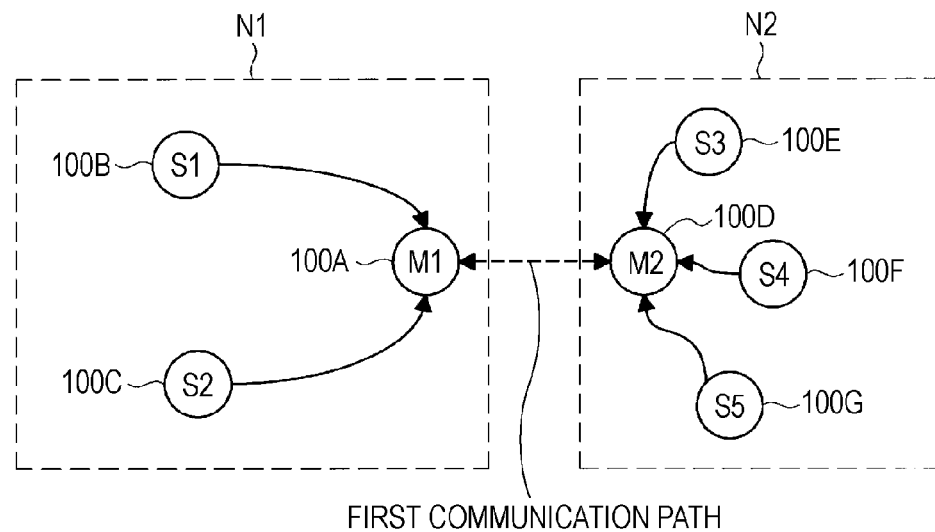
FIG. 3B is an explanatory diagram illustrating an overview of the processes related to the communication stabilization approach according to an embodiment.
Figure 3C:
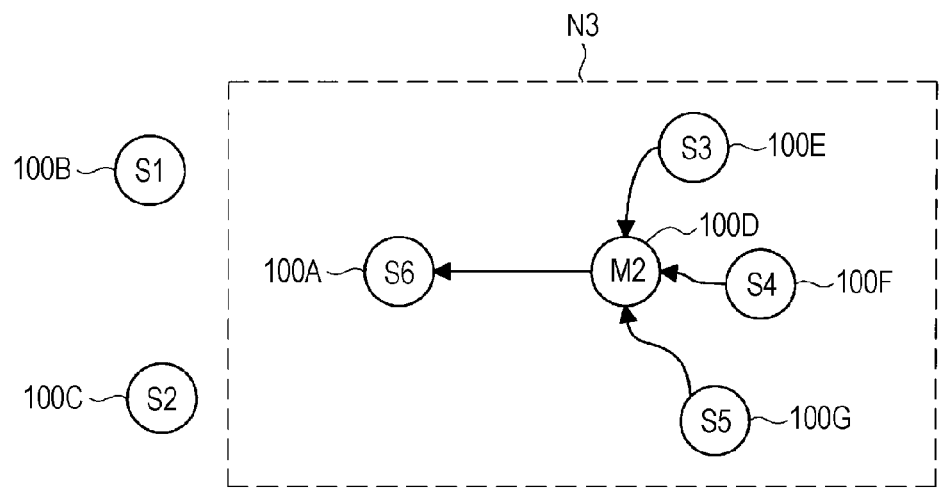
FIG. 3C is an explanatory diagram illustrating an overview of the processes related to the communication stabilization approach according to an embodiment.
Figure 3D:
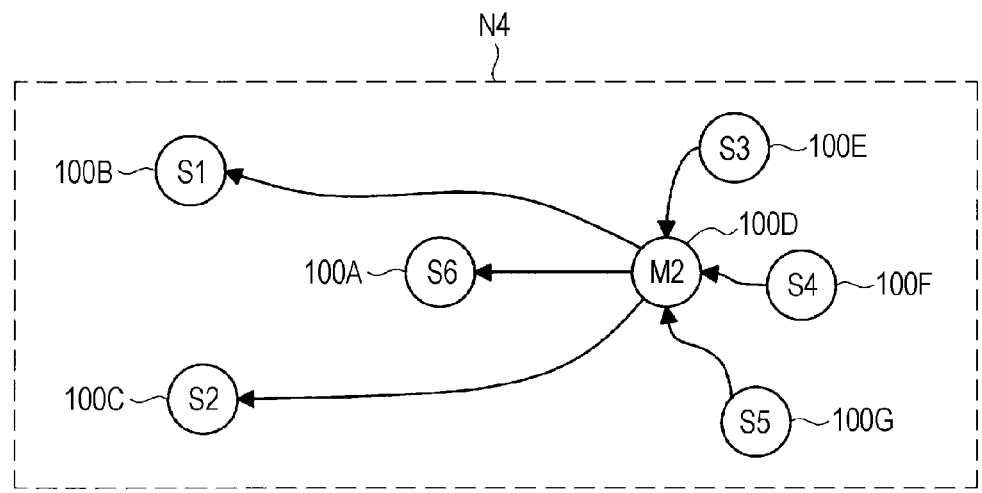
FIG. 3D is an explanatory diagram illustrating an overview of the processes related to the communication stabilization approach according to an embodiment.

FIGS. 3A to 3D are explanatory diagrams illustrating the overview of the process related to the communication stabilization approach according to an embodiment. FIG. 3A shows a state before the integration of the networks. FIGS. 3B and 3C show states after the integration of the networks. FIG. 3D shows a state where the networks are integrated. In FIGS. 3A to 3D, an information processing apparatus playing a role of a master apparatus of a network is indicated by "Mm" (where m is a natural number). In addition, an information processing apparatus plays a role of a slave apparatus is indicated by "Sn". Hereinafter, information processing apparatuses 100 represent "master apparatuses Mm" and "slave apparatuses Sn".

(A) State Before Integration (FIG. 3A)

In FIG. 3A, a network N1 organized by information processing apparatuses 100A, 100B, and 100C is shown. In addition, a network N2 organized by information processing apparatuses 100D, 100E, 100F, and 100G is shown. Here, in the network N1, the information processing apparatus 100A plays the role of the master. The information processing apparatuses 100B and 100C play the role of the slaves. In the network N2, the information processing apparatus 100D plays the role of the master. The information processing apparatuses 100E, 100F, and 100G play the role of the slaves. Hereinafter, one of the networks N1 and N2 is also termed a "first network" and the other thereof is also termed a "second network.

The information processing apparatuses 100A to 100F (hereinafter, also termed "information processing apparatuses 100") organizing the networks N1 and N2 each have a function of carrying out communication between the other information processing apparatuses 100 by using two different communication paths. Now, will be described the meaning of the information processing apparatuses 100 having the function of carrying out communication with the other information processing apparatuses 100 by using the two different communication paths.

Meaning of Information Processing Apparatuses 100 having Function of Carrying out Communication with Other Information Processing Apparatuses 100 by Using Two Different Communication Paths When a network is organized by the communication between the information processing apparatuses 100, it is necessary to carry out a communication method at high speed and more securely. Therefore, even when the network is organized by the communication between the information processing apparatuses 100 connected to each other using IEEE 802.15.1, it is necessary to perform various kinds of connection setting (for example, address information and passcode) such as communication setting of IEEE 802.15.1. When a user has to operate a predetermined connection setting, the work on the various kinds of setting to make the communication possible between the information processing apparatuses 100 may considerably lessen the user's convenience.

In an embodiment, setting information used to set a communicable state in a first communication path (which is described below) and a second communication path (which is described below) and network organization information representing the organization of the network belonging to the information processing apparatus are transmitted and received between the information processing apparatuses 100. An example of the setting information according to an embodiment and an example of the network organization information with reference to FIGS. 4 and 5 will be described.

The first communication path refers to a communication path formed by a communication method of carrying out one-to-one communication between the one information processing apparatus 100 and the other information processing apparatuses 100 without performing special connection setting by the user. An example of the first communication path according to the embodiment includes a communication path formed by NFC (Near Field Communication) using a magnetic field (carrier waves) of a predetermined frequency such as 13.56 MHz in communication. However, the application is not limited thereto. In the embodiment, for example, a communication path formed by infrared communication using infrared rays may be used as the first communication path.

When the first communication path is the communication path formed by NFC, one information processing apparatus 100 plays the role of a reader/writer that mainly transmits carrier waves. In this case, the other information processing apparatus 100 receives signals transmitted by the carrier waves from the one information processing apparatus 100, performs load modulation in response to the received signals, and makes a reply to the one information processing apparatus 100. One information processing apparatus 100 and the other information processing apparatuses 100 can carry the communication via the first communication path by transmitting and receiving the signals, for example.

The second communication path refers to a communication path formed by a communication method of carrying out one-to-one communication between one information processing apparatus 100 and the other information processing apparatuses 100 without performing special connection setting of the user and carrying out high-speed communication. The second communication path corresponds to a communication path used for the communication to organize the star-type network by use of the frequency hopping spread spectrum. An example of the second communication path according to the embodiment includes wireless communication using IEEE 802.15.1, for example, but the present application is not limited thereto.

In an embodiment, each of the information processing apparatuses 100 organizing the network has the function of carrying out communication with the other information processing apparatuses 100 using two different communication paths. Therefore, it is possible to improve user's convenience and maintain a communicable state between the information processing apparatuses 100.

(B) First state Related to Integration of Networks (FIG. 3B)

(B-1) Communication Process via First Communication Path

When the integration of the networks is started, the communication via the first communication path is carried out between one of the information processing apparatuses 100 belonging to the network N1 and the other information processing apparatuses 100 belonging to the network N2.

FIG. 3B shows a first state where the process related to the integration of the networks N1 and N2 is started. In the first state, the communication via the first communication path is started between a master apparatus M1 of the network N1 and a master apparatus M2 of the network N2. Setting information and network organization information are transmitted and received between the master apparatuses M1 and M2. FIG. 3B shows the example where the master apparatus M1 (the information processing apparatus 100A) of the network N1 and the master apparatus M2 (the information processing apparatus 100D) of the network N2 carry out the communication via the first communication path. However, the application is not limited thereto. Hereinafter, will be described a process related to the communication stabilization approach according to the embodiment in the example where the master apparatus M1 of the network N1 and the master apparatus M2 of the network N2 carry out the communication via the first communication path. Other examples are described below.

Example of Information Transmitted and Received via First Communication Path

Figure 4:
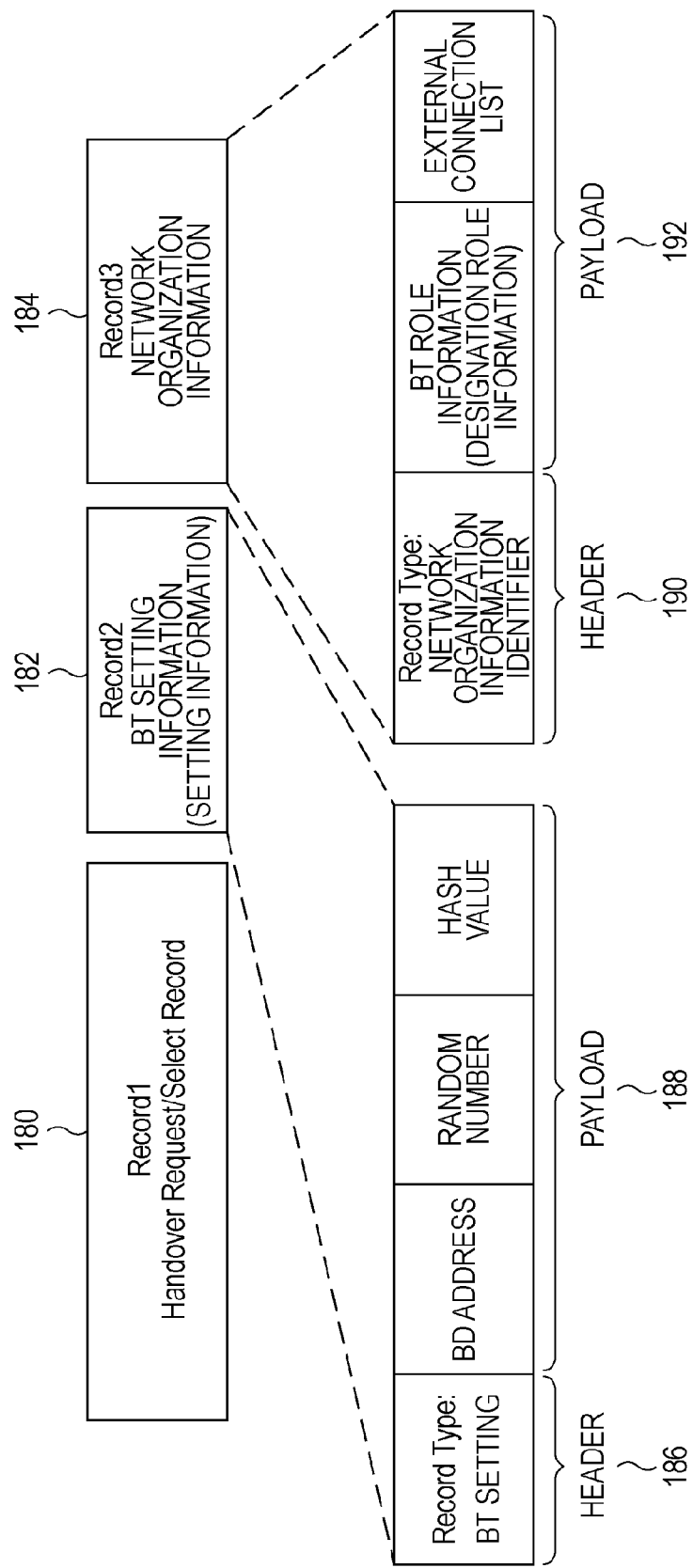
FIG. 4 is an explanatory diagram illustrating a first example of information transmitted and received via a first communication path according to an embodiment.

FIG. 4 is an explanatory diagram illustrating a first example of information transmitted and received via the first communication path according to an embodiment.

The information of the first example transmitted and received via the first communication path includes request information 180 requesting communication related to the second communication path, setting information 182, and network organization information 184.

The request information 180 contains handover Record-Type (for example, "Hr" or "Hs") indicating that a message is used for handover. Here, the handover indicates a switch action from the communication via the first communication path serving as a first communication method to the communication via the second communication path serving as a second communication method (second carrier). When the information processing apparatus 100 receives the request information 180 via the first communication path, the information processing apparatus 100 can grasp that a communication target via the first communication path requests to carry out communication via the second communication path.

The setting information 182 is information used for an external apparatus to make connection to the second communication path. The setting information 182 includes a header 186 (BT setting) indicating kinds of information and a payload 188. The payload 188 includes address information (BD address) used for the external apparatus to make connection to the second communication path, a passcode (authentication information such as a random number) used for authentication to improve security, and a hash value. However, the present application is not limited thereto.

When the information processing apparatus 100 transmits the passcode to another information processing apparatus 100 carrying out the communication via the second communication path, the same passcode is shared between the information processing apparatuses 100 belonging to the other networks. Therefore, security can be further improved, since the information processing apparatus 100 performs the authentication using the passcode upon starting the communication via the second communication path and selectively performs the communication via the second communication path on the basis of the authentication result. Here, the passcode may be a passcode (temporary passcode) which can temporarily be authenticated normally for a certain period, but the application is not limited thereto. When no authentication is performed to improve the security, the information (authentication information) regarding the passcode may not be included in the setting information.

The network organization information 184 is information indicating the organization of the network to which the information processing apparatus 100 transmitting the network organization information 184 belongs. The network organization information 184 includes a header 190 (a network organization information identifier) indicating a kind of information and a payload 192. The payload 190 includes designation role information (BT role information) and an external connection list. However, the application is not limited thereto.

The designation role information according to an embodiment refers to information (data) indicating a requested role (for example, a master/a role other than the master) in the communication via the second communication path. The information processing apparatus 100 sets information, which indicates the role in the communication via the second communication path in the network to which this information processing apparatus 100 belongs, as the designation role information included in the network organization information. However, the present application is not limited thereto. For example, the information processing apparatus 100 may set information, which indicating a role different from the role in the network to which this information processing apparatus belongs to, as the designation role information included in the network organization information on the basis of an operation of the user of the information processing apparatus 100. The designation role information transmitted by the information processing apparatus 100 is used in a role determining process (which is described below) of the other information processing apparatuses 100.

The external connection list refers to information (data) including the setting information used for an external apparatus to carry out communication with another information processing apparatus 100, which organizes the network to which the information processing apparatus 100 belongs, other than the information processing apparatus 100 transmitting the network organization information. When the information processing apparatus 100 transmits the external connection list to another information processing apparatus 100 carrying out the communication via the second communication path, the another information processing apparatus 100 can carry out the communication with the information processing apparatuses 100 belonging to another network via the second communication path.

The information shown in FIG. 4 is transmitted and received between the information processing apparatuses 100A and 100D, the information processing apparatuses 100A and 100D can carry out communication with the information processing apparatuses 100 belonging to another network via the second communication path. A specific process will be described below in a case where the information, which is shown in FIG. 4, of the first example transmitted and received via the first communication path is transmitted and received between the information processing apparatuses 100.

Figure 5:
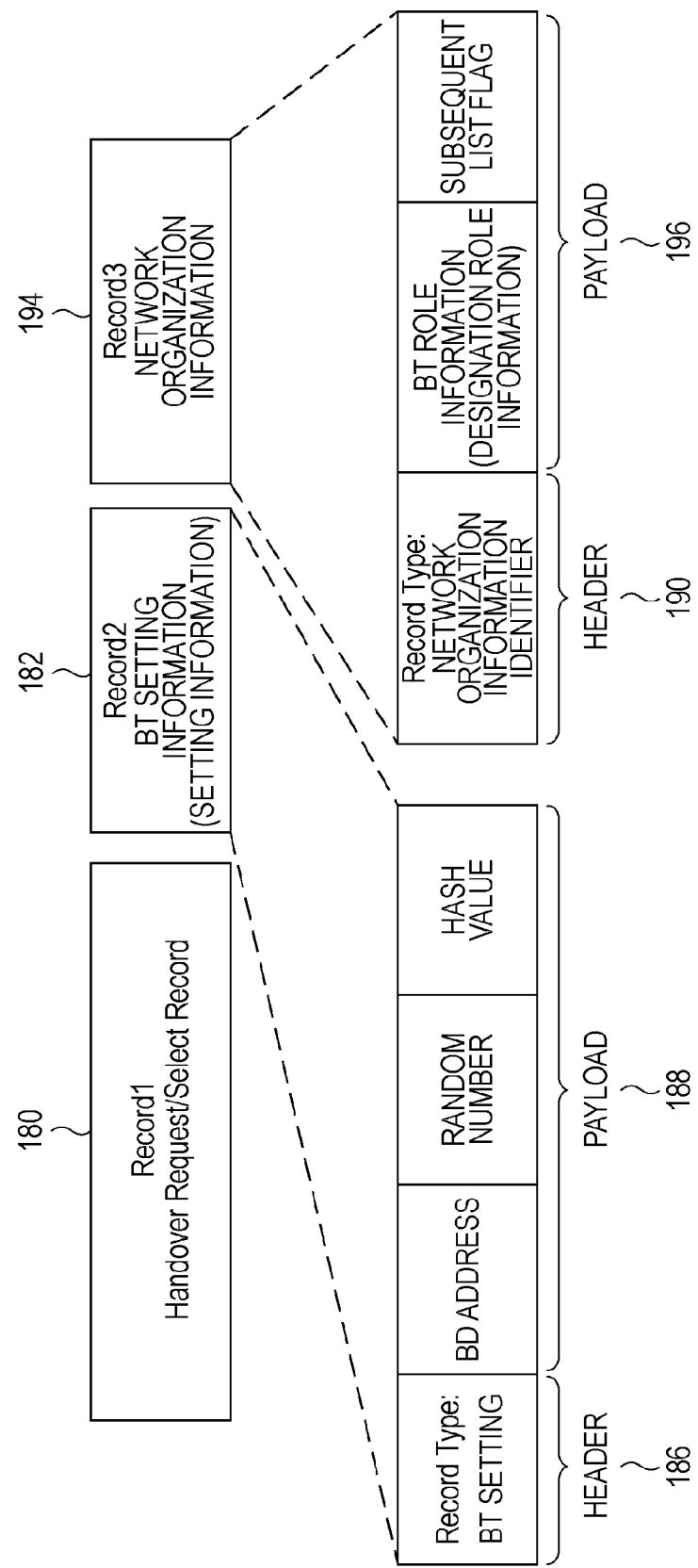
FIG. 5 is an explanatory diagram illustrating a second example of the information transmitted and received via the first communication path according to an embodiment.

The information transmitted and received via the first communication path according to an embodiment is not limited to the example shown in FIG. 4. FIG. 5 is an explanatory diagram illustrating a second example of the information transmitted and received via the first communication path according to an embodiment.

The information of the second example transmitted and received via the first communication path includes the request information 180, the setting information 182, and the network organization information 194. The request information 180 and the setting information 182 shown in FIG. 5 are the same as the request information 180 and the setting information 182 of the first example shown in FIG. 4.

The network organization information 184 includes the header 190 (network organization information identifier) and a payload 196. For example, the payload 196 includes designation role information and a subsequent list flag. However, the application is not limited thereto. The subsequent list flag according to an embodiment refers information (notification information) notifying whether the external connection list is transmitted in subsequent communication. For example, the subsequent list flag is one-bit data (for example, the external connection list is not transmitted in the subsequent communication when the subsequent list flag is "0" and the external connection list is transmitted in the subsequent communication when the subsequent list flag "1"). However, the application is not limited thereto.

When the information shown in FIG. 5 is transmitted and received via the first communication path between the information processing apparatuses 100A and 100D, the external connection list is transmitted and received via the second communication path through which the connection is allowable using the setting information shown in FIG. 4. A specific process will be described below in a case where the information, which is shown in FIG. 5, of the second example transmitted and received via the first communication path is transmitted and received between the information processing apparatuses 100.

The information shown in FIGS. 4 and 5 is transmitted and received between the information processing apparatuses 100A and 100D by the communication via the first communication path. Here, the process of (B-1) may be considered as a "process of exchanging an address and a confirmation" between the information processing apparatuses 100A and 100D, for example.

(B-2) Role Determining Process

When the information shown in FIGS. 4 and 5, for example, is transmitted and received via the first communication path by the process of (B-1), the information processing apparatuses 100A and 100D perform a role determining process of determining a role in the communication via the second communication path in the integrated network. Here, the role determining process refers to a process of determining whether the information processing apparatus 100 serves as the master apparatus in the communication via the second communication path in the integrated network.

More specifically, the information processing apparatuses 100 perform the role determining process on the basis of the designation role information regarding the information processing apparatus and the network organization and role adjustment information received via the first communication path.

Here, the information processing apparatus 100 sets the information (for example, information indicating the master or slave apparatus), which indicates the role in the communication via the second communication path in the network to which the information processing apparatus belongs, as the designation role information regarding the information processing apparatus. However, the application is not limited thereto. For example, the information processing apparatus 100 may set information, which indicates a role different from the role in the network to which the information processing apparatus belongs, as the designation role information regarding the information processing apparatus on the basis of an operation of the user of the information processing apparatus 100.

FIG. 6 is an explanatory diagram illustrating an example of the role adjustment information used to perform the role determining process by the information processing apparatus 100 according to the embodiment. FIG. 6 shows the example of a table regarding the role adjustment information, but the application is not limited thereto.

The information processing apparatus 100 grasps a requested role of the information processing apparatus 100 (corresponding to the target apparatus in FIG. 6) which is a communication target apparatus carrying out the communication via the second communication path on the basis of the designation role information (for example, the BT role information shown in FIGS. 4 and 5) regarding an external apparatus included in the network organization information received via the first communication path. The information processing apparatus 100 determines the role, which is performed via the second communication path by the information processing apparatus, by applying the role of the grasped target apparatus and the requested role of the information processing apparatus grasped by the designation role information regarding the information processing apparatus to the role adjustment information shown in FIG. 6.

For example, the requested role of the information processing apparatus is matched with the requested role of the target apparatus, the information processing apparatus 100 determines the role on the basis of the number (corresponding to "the number of information processing apparatuses organizing the network −1") of external apparatuses connected to the target apparatus. The information processing apparatus 100 can grasp the number of external apparatuses connected to the target apparatus on the basis of the external connection list (in the case of FIG. 4) included in the network organization information received via the first communication path or the external connection list (in the case of FIG. 5) received via the second communication path. Moreover, when the external connection list is received via the second communication path (in the case of FIG. 5), the target apparatus, for example, temporarily plays the role of the master. Then, the information processing apparatus 100 can acquire the external connection list from the target apparatus. However, the application is not limited thereto.

The information processing apparatus 100 can determine the role in the communication via the second communication path in the integrated network by using the role adjustment information shown in FIG. 6, for example. The role adjustment information according to the embodiment is not limited to the example shown in FIG. 6. For example, the role adjustment information according to the embodiment may further include information regarding a condition related to determination of the role in a case where the number of external apparatuses connected to the information processing apparatus is equal to the number of external apparatuses connected to the target apparatus. An example of the condition includes a condition that "the information processing apparatus 100 in charge of a reader/writer in the communication via the first communication path serves as the master apparatus" (a case where the NFC communication is carried out via the first communication path). However, the application is not limited thereto.

When the information processing apparatuses 100A and 100D perform the above-described role determining process, one of the information processing apparatuses 100A and 100D plays the role of the master and the other thereof plays the role of the slave in the communication via the second communication path in the integrated network.

(C) Second State Related to Integration of Networks (FIG. 3C)

When the roles of the information processing apparatuses 100A and 100D are determined in the communication via the second communication path by the process of (B-2), the communication is started via the second communication path between the information processing apparatuses 100A and 100D on the basis of the determined roles. FIG. 3C shows an example where it is determined by the process of (B-2) that the information processing apparatus 100A plays the role of the slave and the information processing apparatus 100D plays the role of the master. When the communication is started via the second communication path between the information processing apparatuses 100A and 100D, as in FIG. 3C, the information processing apparatus 100A (serving as the slave apparatus S6) is integrated into the network N2 to form a new network N3. More specifically, the state shown in FIG. 3C is realized by the processes of (C-1) and (C-2), which are described below.

(C-1) Process of Preparing Integration of Networks on the Basis of Determined Roles The information processing apparatus 100A determined to play the role of the slave by the process of (B-2) on the basis of the determined roles disconnects the communication with the slave apparatuses (the information processing apparatuses 100B and 100C) organizing the network N1 via the second communication path (disconnection process).

The information processing apparatus 100A transmits the passcode (for example, the random number included in the payload 188 shown in FIG. 4) transmitted in the process of (B-1), for example, to the information processing apparatuses 100B and 100C, before the information processing apparatus 100A disconnects the communication via the second communication process. In this way, the information processing apparatuses 100B and 100C playing the role of the slaves in the network N1 and the information processing apparatus 100D playing the role of the master in the network N2 can share the same passcode. Therefore, in a process of (D-1), which is described below, the information processing apparatuses 100D and the 100B and the information processing apparatus 100D and 100C can perform the authentication using the passcode. In this way, the integration of the networks N1 and N2 can be realized while maintaining the security.

The example has been described where the information processing apparatus 100A transmits the passcode transmitted in the process of (B-1) to the information processing apparatuses 100B and 100C (which corresponds to an example where a common passcode is set in the network N1). However, the application is not limited thereto. For example, the information processing apparatus 100A may create a separate passcode for each of the other information processing apparatuses 100 organizing the network N1 and transmits the separate passcode to the corresponding information processing apparatus 100.

Here, the information processing apparatus 100A may transmit the external connection list including information regarding the passcode to the information processing apparatus 100D in the process of (B-1). Therefore, even when the information processing apparatus 100A creates the separate passcode as in the above example, the information processing apparatuses 100D and 100B and the information processing apparatus 100D and 100C can respectively share the same passcode. Even when the information processing apparatus 100A sets the common passcode in the network N1, the information processing apparatus 100A can, of course, transmit the external connection list including the information regarding the passcode to the information processing apparatus 100D in the process of (B-1). When no authentication is performed, the information processing apparatus 100A does not permit the information (authentication information) regarding the passcode to be included in the external connection list.

By the disconnection process, the information processing apparatuses 100B and 100C organizing the network N1 may not carry out the communication with the other information processing apparatuses 100 organizing the network N1 via the second communication path. That is, by the disconnection process, the network N1 does not function as the star-type network.

When the role of the master is performed in the process of (B-2), the information processing apparatus 100D maintains the communication with the slave apparatuses (the information processing apparatuses 100E, 100F, and 100G) organizing the network N2 via the second communication path.

(C-2) Pairing Process in Second Communication Path

The information processing apparatus 100D playing the role of the master and the information processing apparatus 100A playing the role of the slave perform a pairing process in the communication via the second communication path. Here, the pairing process is realized by the following processes, for example, in the communication via the second communication path. The communication via the second communication path between the information processing apparatuses 100A and 100D is carried out by a frequency hopping pattern determined by the information processing apparatus 100D playing the role of the master.

Example of Pairing Process

Exchange of Public Key (Sharing of Common Key)

The information processing apparatus 100 transmits information regarding a packeted public key (for example, 192-bit elliptic code) to a connecting target apparatus in the communication via the second communication path on the basis of address information (for example, the BD address shown in FIG. 4) included in a packet received via the first communication path. The information processing apparatus 100 calculates a common key on the basis of the information regarding the public key transmitted by the information processing apparatus 100 of a connection destination, as described above (Diffie-Hellman key exchange method).

Authentication Process

The information processing apparatus 100 exchanges a confirmation with the information processing apparatus 100 of the connection destination via the second communication path and confirms that the communication target is appropriate.

Creating of Link Key

The information processing apparatus 100 creates the link key, which is information used for authentication in the communication subsequent to a second time.

By the pairing of the process (C-2), the information processing apparatuses 100A and 100D are in a state where the transmission and reception of data via the second communication path can be performed arbitrarily. The pairing between the information processing apparatuses 100A and the 100D may be understood as the series of processes of (B-1) and (C-2) related to the communication via the first communication path. When the pairing is understood as the series of processes, the pairing may be understood as a pairing method corresponding to an OOB (OutOfBand) method, which is one of SSP (Secure Simple Pairing) authentication methods. Of course, the pairing method according to the embodiment is not limited to the method corresponding to the OOB method.

When the information processing apparatuses 100A and 100D perform the processes of (C-1) and (C-2), the state shown in FIG. 3C is realized.

(D) Integrated State (FIG. 3D)

The new star-type network N3 is organized by integrating the information processing apparatus 100A organizing the network N1 into the network N2 in the process of (C) (FIG. 3C). However, as shown in FIG. 3C, the information processing apparatuses 100B and 100C organizing the network N1 do not organize the network N3. Therefore, in the state shown in FIG. 3, it is not considered that the networks N1 and N2 are integrated into each other.

In order to integrate the networks N1 and N2, the information processing apparatus 100D playing the role of the master in the network N3 performs the following process of (D-1), for example.

(D-1) Connection Process via Second Communication Path

On the basis of the network organization information acquired from the information processing apparatus 100A in the process of (B-1), the information processing apparatus 100D makes connection to the information processing apparatuses 100B and 100C by using the communication via the second communication path. More specifically, the information processing apparatus 100D takes out the setting information from the external connection list included in the network organization information acquired from the information processing apparatus 100A in order to carry out the communication with each of the information processing apparatuses 100B and 100C via the second communication path. On the basis of the setting information, the information processing apparatus 100D carries out the communication with each of the information processing apparatuses 100B and 100C via the second communication path. Here, examples of the setting information included in the external connection list include the address information (BD address) or the address information (BD address) and the passcode (random number). However, the application is not limited thereto.

By the process of (D-1), data can be transmitted and received arbitrarily via the second communication path between the information processing apparatuses 100D and 100B and between the information processing apparatuses 100D and 100C. By the process of (B-1) and the process of (C-1), the same passcode is shared between the information processing apparatuses 100D and 100B and between the information processing apparatuses 100D and 100C. Therefore, the information processing apparatus 100D authenticates the information processing apparatuses 100B and 100C by using the passcode so as to transmits and receive data arbitrarily.

By the process of (D-1), the information processing apparatuses 100B and 100C organizing the network N1 organize a new star-type network N4 into which the network N3 is integrated (FIG. 3D).

As shown in FIG. 3D, the network N4 corresponds to a star-type network in which the networks N1 and N2 shown in FIG. 3A are integrated into each other. That is, the processes of (B-1) to (D-1) are performed between the information processing apparatuses 100 organizing the first network and the information processing apparatuses 100 organizing the second network to realize the star-type network.

By performing the process related to the communication stabilization approach according to the embodiment, it is possible to reduce the possibility that unintended communication failure occurs, compared to the case of the scatternet or the case of using the technology according to the known example. Moreover, by performing the process related to the communication stabilization approach according to the embodiment, the complexity of the process related to the communication is reduced, compared to the case of the scatternet. Therefore, it possible to realize an application, such as a game using the communication via the second communication path, using the communication via the second communication path between the information processing apparatuses.

Accordingly, by performing the process related to the communication stabilization approach according to the embodiment, it is possible to carry out more stable communication between any of the information processing apparatuses organizing the integrated network, as well as communication between the information processing apparatuses belonging to different star-type networks.

Specific Example of Process Related to Communication Stabilization Approach

Next, the above-described process related to the communication stabilization approach according to the embodiment will be described in more detail. Hereinafter, a case will be described where the networks N1 and N2 shown in FIG. 3A are integrated into one start-type network. Communication other than the steps specified as communication via the "first communication path" will be described below as communication via the "second communication path". Hereinafter, it is assumed that the network N1 is referred to as a "first network" and the network N2 is referred to as a "second network". Of course, the network N1 may be referred to as the "second network" and the network N2 may be referred to as the "first network".

[1] First Example of Process Related to Communication Stabilization Approach

FIG. 7 is an explanatory diagram illustrating a first example of the process (communication method) related to the communication stabilization approach according to the embodiment. FIG. 7 shows an example of the process (the process related to the communication stabilization approach) in which the master apparatus M1 (the information processing apparatus 100A) of the network N1 shown in FIG. 3A carries out the communication with the master M2 (the information processing apparatus 100D) of the network N2 via the first communication path.

Figure 8A:
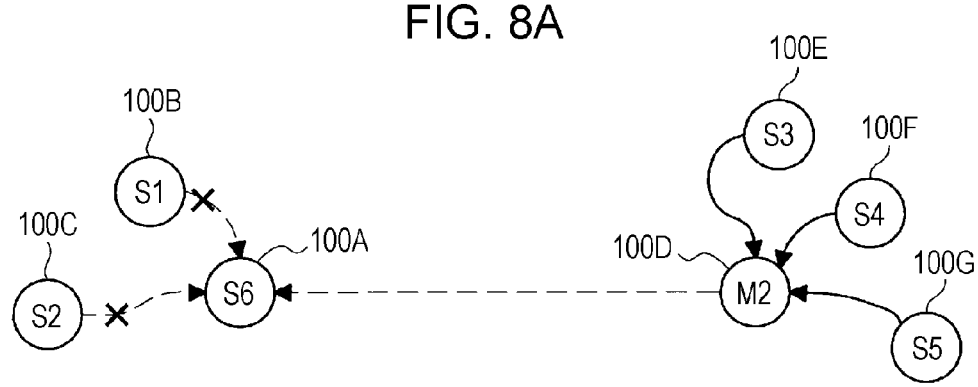
FIG. 8A is an explanatory diagram supplementarily illustrating an example of the process shown in FIG. 7.
Figure 8B:
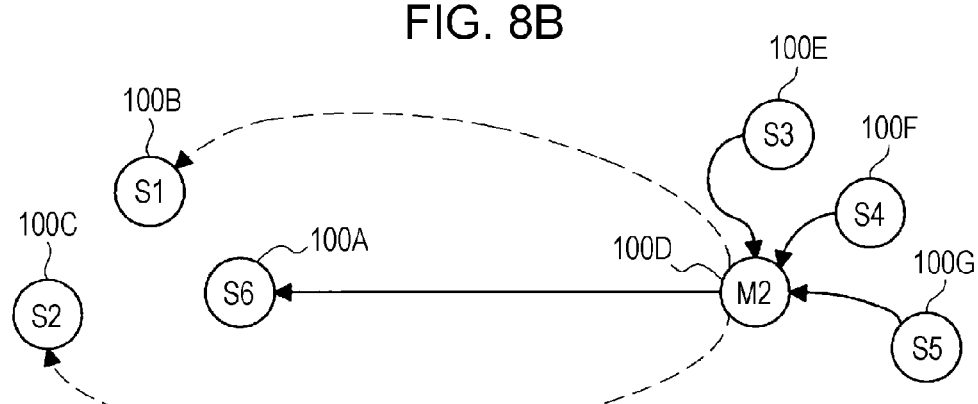
FIG. 8B is an explanatory diagram supplementarily illustrating an example of the process shown in FIG. 7.
Figure 8C:
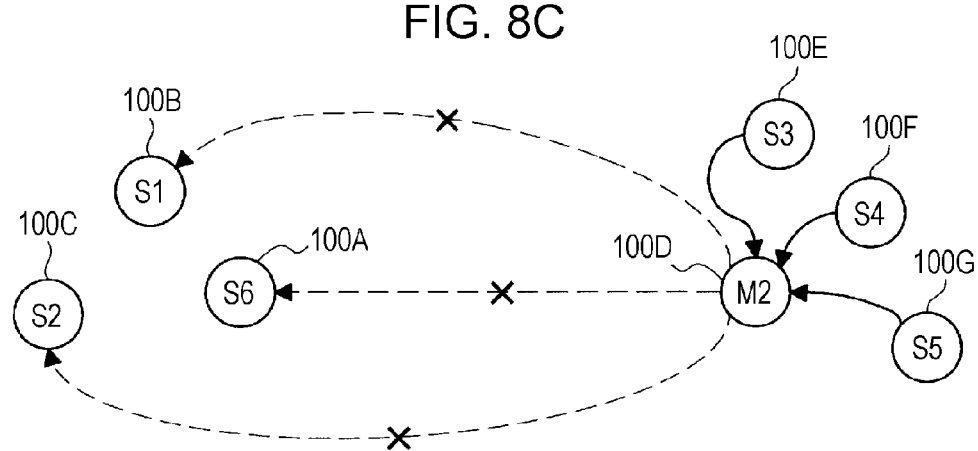
FIG. 8C is an explanatory diagram supplementarily illustrating an example of the process shown in FIG. 7.

FIGS. 8A to 8C are explanatory diagrams illustrating the example of the process shown in FIG. 7. Hereinafter, the first example of the process related to the communication stabilization approach will be described appropriately with reference to FIGS. 8A to 8C.

In the first example of the process related to the communication stabilization approach described with reference to FIG. 7, the master apparatus of the network N1 is referred to as the "master apparatus (100A)" and the slave apparatuses of the network N1 are referred to as the "slave apparatuses (100B and 100C). In the first example of the process related to the communication stabilization approach described with reference to FIG. 7, the master apparatus of the network N2 is referred to as the "master apparatus (100D)" and the slave apparatuses of the network N1 are referred to as the "slave apparatuses (100E to 100G)".

The master apparatus (100A) creates the external connection list related to the first network (S100: a process of creating the external connection list).

FIGS. 9A and 9B are explanatory diagrams illustrating examples of the external connection list according to the embodiment. FIG. 9A shows an example of the setting information used for an external apparatus to make connection to the information processing apparatuses 100B and 100C organizing the network N1 via the second communication path, and shows a case where the setting information is the BD address. FIG. 9B shows an example of the passcode used for the authentication when the communication is carried out with the information processing apparatuses 100B and 100C organizing the network N1 via the second communication path.

Since the master apparatus (100A) is the master apparatus of the network N1, the master apparatus (100A) stores information used to carry out the communication with the information processing apparatuses 100B and 100C serving as the slave apparatuses via the second communication path. Therefore, the master apparatus (100A) can create the setting information shown in FIG. 9A by using the stored information. Moreover, when the master apparatus (100A) stores the setting information shown in FIG. 9A in advance, the master apparatus (100A) may include the stored setting information in the external connection list.

The master apparatus (100A) creates the passcode shown in FIG. 9B by generating a random number, for example. Here, the master apparatus (100A) creates the passcode by generating the random number under the condition of a predetermined number generation such as setting of the maximum number of bits. However, the present application is not limited thereto. FIG. 9B shows the example where the master apparatus (100A) creates a common passcode of the information processing apparatuses 100B and 100C. However, the application is not limited thereto. For example, the master apparatus (100A) may create a unique passcode (a unique passcode of each address shown in FIG. 9A) of each of the slave apparatuses belonging to the network N1.

The master apparatus (100A) may create the setting information shown in FIG. 9A or the external connection list including the setting information shown in FIG. 9A and the passcode show in FIG. 9B, for example, by the above-described process.

The first example of the process related to the communication stabilization approach will be described again with reference to FIG. 7. When the master apparatus (100A) performs the process of creating the external connection list in step S100, the master apparatus (100A) transmits the information such as first setting information and first network organization information to the master apparatus (100D) via the first communication path (S102).

Here, the information transmitted in step S102 corresponds to the information shown in FIG. 4, for example. The first setting information transmitted in step S102 corresponds to the setting information 182 shown in FIG. 4. The first network organization information transmitted in step S102 corresponds to the setting information 184 shown in FIG. 4. The external connection list created in step S100 is included in the first network organization information.

The master apparatus (100D) receiving the information transmitted via the first communication path from the master apparatus (100A) in step S102 creates the external connection list (S104: a process of creating the external connection list).

FIGS. 10A and 10B are explanatory diagrams illustrating examples of the external connection list according to the embodiment. FIG. 10A shows an example of the setting information used for an external apparatus to make connection to the information processing apparatuses 100E, 100F, and 100G organizing the network N2 via the second communication path, and shows a case where the setting information is the BD address. FIG. 10B shows an example of the passcode used for the authentication when the communication is carried out with the information processing apparatuses 100E, 100F, and 100G organizing the network N2 via the second communication path.

Since the master apparatus (100D) is the master apparatus of the network N2, as in the master apparatus (100A), the master apparatus (100D) can create the setting information shown in FIG. 10A, by using the stored information. Moreover, when the master apparatus (100D) stores the setting information shown in FIG. 10A in advance, the master apparatus (100D) may include the stored setting information in the external connection list.

The master apparatus (100D) creates the passcode shown in FIG. 10B by generating a random number, for example, as in the master apparatus (100A). FIG. 10B shows the example where the master apparatus (100D) creates a common passcode of the information processing apparatuses 100E, 100F and 100G. However, the application is not limited thereto. For example, the master apparatus (100D) may create a unique passcode (a unique passcode for each address shown in FIG. 10A) for each of the slave apparatuses belonging to the network N2.

The master apparatus (100D) may create the setting information shown in FIG. 10A or the external connection list including the setting information shown in FIG. 10A and the passcode show in FIG. 10B, for example, by the above-described process.

The first example of the process related to the communication stabilization approach will be described again with reference to FIG. 7. The master apparatus (100D) receiving the information transmitted via the first communication path from the master apparatus (100A) in step S102 performs the role determining process on the basis of the received information (S106). Here, the master apparatus (100D) determines the role in the communication via the second communication path with the master apparatus (100A) by performing the process of (B-2), for example.

More specifically, the master apparatus (100D) grasps the requested role of the information processing apparatus on the basis of the designation role information regarding the information processing apparatus, for example. The master apparatus (100D) grasps the requested role of the master (100A) on the basis of the designation role information included in the received first network organization information. The master apparatus (100D) determines the role in the communication via the second communication path with the master apparatus (100A) on the basis of the role adjustment information (for example, see FIG. 6). For example, when the master apparatus (100D) makes a request for the master apparatus and the master apparatus (100A) also makes a request for the master apparatus, the master apparatus (100D) is determined as the master apparatus due to the fact that the master apparatus (100D) makes connection with the more external apparatuses than the master apparatus (100A). Hereinafter, a case will be described where the master apparatus (100D) is determined to play the role of the master in the communication with the master apparatus (100A) via the second communication path in step S106.

FIG. 7 shows the example where the master apparatus (100D) performs the process of step S106 after the process of step S104. However, the application is not limited thereto. For example, the master apparatus (100D) may separately perform the process of step S104 and the process of step S106. In the above case, since the master apparatus (100D) can perform the process of step S104 after the process of step S106, the master apparatus (100D) may perform the process of step S106 in synchronization with the start of the process of step S104.

When the master apparatus (100D) performs the processes of steps S104 and S106, the master apparatus (100D) transmits the information such as second setting information and the second network organization information to the master apparatus (100A) via the first communication path (S108).

Here, the information transmitted in step S108 corresponds to the information shown in FIG. 4, for example. The second setting information transmitted in step S108 corresponds to the setting information 182 shown in FIG. 4. The second network organization information transmitted in step S108 corresponds to the setting information 184 shown in FIG. 4. The external connection list created in step S104 is included in the second network organization information.

FIG. 7 shows the example where the master apparatus (100D) performs the process of step S108 after the process of step S106. However, the application is not limited thereto. For example, the master apparatus (100D) may separately perform the process of step S106 and the process of step S108. In the above case, since the master apparatus (100D) can perform the process of step S106 after the process of step S108, the master apparatus (100D) may perform the process of step S108 in synchronization with the start of the process of step S106.

The master apparatus (100D) can also transmit the result of the process of step S106, that is, the information regarding the role determined by the master apparatus (100D) in step S108. The master apparatus (100D) may include the result (that is, determination role information regarding the determined role) of the process of step S106 in the second network organization information, when the designation role information is substituted. In the above case, the master apparatus (100A) receiving the information regarding the role determined by the master apparatus (100D) via the first communication path can grasp the role determined by the master apparatus (100D) by using the received information. For example, when the master apparatus (100D) is determined to play the role of the master, the master apparatus (100A) is determined to play the role of the slave. In this way, it is possible to simplify the role determining process in step S110, which is described below. Here, the simplification of the role determining process refers to a process in which the role of the information processing apparatus 100 can be determined using the role adjustment information (for example, FIG. 6).

The master apparatus (100A) receiving the information transmitted via the first communication path from the master apparatus (100D) in step S108 performs the role determining process on the basis of the received information (S110). Here, the master apparatus (100A) determines the role in the communication via the second communication path with the master apparatus (100D) by performing the process of (B-2), like the process of step S106 in the master apparatus (100D). However, the application is not limited thereto.

Hereinafter, example will be described where the master apparatus (100A) is determined to play the role of the slave in the communication via the second communication path with the master apparatus (100D) in the process of step S110.

When the master apparatus (100A) determined to play the role of the slave in step S110 transmits the temporary passcode to the slave apparatuses (100B and 100C) of the network N1 (S112). Here, the temporary passcode transmitted in step S112 by the master apparatus (100A) corresponds to the passcode (for example, see FIG. 9B) included in the external connection list of the first network organization information transmitted in step S102. Therefore, in the process of step S112, the master apparatus (100D) and the slave apparatuses (100B and 100C) share the same passcode. FIG. 7 shows the example of a temporary passcode (for example, a temporary passcode that is an authentication normally for a certain period). However, the application is not limited thereto.

When the master apparatus (100A) transmits the temporary passcode in step S112, the master apparatus (100A) disconnects the communication via the second communication path with the slave apparatuses (100B and 100C) (S114: a process of disconnecting the second communication path).

The master apparatus (100D) determined to play the role of the master in step S106 starts the communication via the second communication path with the master apparatus (100A) (S116: a process of connecting the second communication path). Here, the master apparatus (100D) performs the process of step S116 after a predetermined period after the completion of the process of step s108, for example, to ensure a time during which the master apparatus (100A) as the communication target performs the processes from step S110 to S114. The application is not limited thereto.

By performing the process of step S114 by the master apparatus (100A) and the process of step S116 by the master apparatus (100D), the state (the state before the integration of the networks N1 and N2) shown in FIG. 3A is changed to the state shown in FIG. 8A. Here, a portion indicated by a dashed line in FIG. 8A represents the communication related to the process of step S114 and the process of step S116. In the following description, the same applies to FIGS. 8B and 8C, FIGS. 12A to 12C, and FIGS. 14B and 14C described below.

When the communication via the second communication path with the master apparatus (100A) is started in step S116, the master apparatus (100D) starts the communication via the second communication path with the slave apparatuses (100B and 100C) (S118: a process of connecting the second communication path).

Here, the master apparatus (100D) acquires the setting information (for example, see FIG. 9A) used for the communication via the second communication path with the slave apparatuses (100B and 100C) from the master apparatus (100A) in step S102. Therefore, the master apparatus (100D) can make the connection via the second communication path with the slave apparatuses (100B and 100C) by using the setting information.

The master apparatus (100D) and the slave apparatuses (100B and 100C) store the same temporary passcode in the process of step S102 and the process of step S112. Therefore, the master apparatus (100D) and the slave apparatuses (100B and 100C) can start the securer communication via the second communication path through the authentication using the temporary passcode.

The state shown in FIG. 8A is changed to the state shown in FIG. 8B, that is, the state where the networks N1 and N2 are integrated into one star-type network, by the process of step S118 by the master apparatus (100D).

FIG. 7 shows the example where the master apparatus (100D) performs the process of step S118 after the process of step S116. However, the application is not limited thereto. For example, the master apparatus (100D) may separately perform the process of step S116 and the process of step S118. In the above case, the master apparatus (100D) may perform the process of step S116 after the process of step S118 or may perform the process of step S118 in synchronization with the start of the process of step S116. Even in the above case, the networks N1 and N2 shown in FIG. 8B are integrated into one star-type network.

Two star-type networks are integrated into one star-type network by performing the process of step S100 to the process of step S118 between the information processing apparatuses 100 organizing the first network and the information processing apparatuses 100 organizing the second network.

The master apparatus (100D) playing the role of the master in the integrated network and the any information processing apparatus 100 playing the role of the slave in the integrated network can arbitrarily perform the communication via the second communication path. Moreover, one information processing apparatus 100 playing the role of the slave in the integrated network and another information processing apparatus 100 playing the role of the slave can arbitrarily perform the communication via the second communication path through the master apparatus (100D).

In this way, communication via the second communication path is carried out between any of the information processing apparatuses among the master apparatus (100A), the slave apparatuses (100B and 100C), the master apparatus (100D), and the slave apparatuses (100E to 100G) (S120). Here, examples of the communication via the second communication path in step S120 include communication, such as a game using the communication via the second communication path, related to the execution of an application using the communication via the second communication path between the information processing apparatuses. However, the application is not limited thereto. For example, the communication via the second communication path in step S120 may be communication related to transmission and reception of various kinds of data such as image data of moving images/still images and voice data.

For example, when the application using the communication via the second communication path between the information processing apparatuses ends, the integration of the networks can be cancelled. Hereinafter, an example where the integrated network is cancelled will be described.

The master apparatus (100D) playing the role of the master in the integrated network performs a process of disconnecting the communication via the second communication path with the master apparatus (100A) belonging to the different network N1 (S122: a process of disconnecting the second communication path). The master apparatus (100D) disconnects the communication via the second communication path with the slave apparatuses (100B and 100C) belonging to the different network N1 (S124: a process of disconnecting the second communication path).

FIG. 7 shows the example where the master apparatus (100D) performs the process of step S124 after the process of step S122. However, the application is not limited thereto. For example, the master apparatus (100D) may separately perform the process of step S122 and the process of step S124. In the above case, the master apparatus (100D) may perform the process of step S122 after the process of step S124 or may perform the process of step S124 in synchronization with the process of step S122.

By performing the process of step S122 and the process of step S124 by the master apparatus (100D), the state where the networks N1 and N2 shown in FIG. 8B are integrated into one star-type network is changed to the state shown in FIG. 8C.

When the communication via the second communication path between the master apparatus (100D) and the slave apparatuses (100B and 100C) is disconnected in the process of step S124, the master apparatus (100D) deletes the link key created using the temporary passcode in the process of step S118 (S126). The slave apparatuses (100B and 100C) with which the communication via the second communication path is disconnected from the master apparatus (100D) delete the link key created using the temporary passcode received from the master apparatus (100A) in the process of step S112 (S128).

Here, the link key is automatically created using the temporary passcode by each of the master apparatus (100D) and the slave apparatuses (100B and 100C). Therefore, in order to improve security, the link key is preferably used to allow the master apparatus (100D) and the slave apparatuses (100B and 100C) to make the temporary connection to each other. In FIG. 7, that is, the process of step S126 in the master apparatus (100D) and the process of step S128 in the slave apparatuses (100B and 100C) are processes performed to improve the security.

For example, when persistent connection is allowed between the master apparatus (100D) and the slave apparatuses (100B and 100C) by an operation of a user, the process of step S126 and the process of step S128 may not be performed.

In this way, by performing the processes shown in FIG. 7, it is possible to integrate two star-type networks into one star-type network between the information processing apparatuses 100 organizing the first network and the information processing apparatuses 100 organizing the second network. Therefore, through the processes of the first example of the communication stabilization approach shown in FIG. 7, it is possible to reduce the possibility that unintended communication failure occurs, compared to the case of the scatternet or the case where the technology according to the known example is used. Moreover, since the complexity of the processes related to communication is reduced by the processes of the first example of the communication stabilization approach in comparison to the case of the scatternet, it is possible to more easily realize an application, such as a game using the communication via the second communication path, using the communication via the second communication path between the information processing apparatuses.

By performing the processes of the first example of the communication stabilization approach according to the embodiment, it is possible to carry out more stable communication between any of the information processing apparatuses organizing the integrated network, as well as the communication between the information processing apparatuses belonging to different star-type networks.

[2] Second Example of Process Related to Communication Stabilization Approach

In the process of the first example of the communication stabilization approach, the master apparatus M1 (the information processing apparatus 100A) of the network N1 shown in FIG. 3A carries out the communication via the first communication path with the master apparatus M2 (the information processing apparatus 100D) of the network N2. However, the process related to the communication stabilization approach according to the embodiment is not limited to the processes in the case where the master apparatus of the first network carries out the communication via the first communication path with the master apparatus of the second network. Next, as a process of a second example of the communication stabilization approach according to an embodiment, a process performed by the slave apparatus of the first network to carry out communication via the first communication path with the master apparatus of the second network will be exemplified.

FIG. 11 is an explanatory diagram illustrating the second example of the process (communication method) related to the communication stabilization approach according to the embodiment. Here, FIG. 11 shows an example of a part of a process (the process related to the communication stabilization approach) when the slave apparatus S1 (the information processing apparatus 100B) of the network N1 shown in FIG. 3A carries out the communication via the first communication path with the master apparatus M2 (the information processing apparatus 100D) of the network N2.

FIGS. 12A to 12D are explanatory diagrams supplementarily illustrating an example of the process shown in FIG. 11. Hereinafter, the second example of the process related to the communication stabilization approach will be described appropriately with reference to FIGS. 12A to 12D.

In the second example of the process related to the communication stabilization approach described with reference to FIG. 11, the master apparatus of the network N1 is referred to as the "the master apparatus (100A)" and the master apparatus of the network N2 is referred to as the "master apparatus (100D)". In the second example of the process related to the communication stabilization approach described with reference to FIG. 11, the slave apparatus S1 of the network N1 is referred to as the "slave apparatus (100B)" and the slave apparatus S2 of the network N1 is referred to as the "slave apparatus (100C)".

The slave apparatus (100B) transmits an external connection list acquiring request (acquiring request) to request the transmission of the external connection list to the master apparatus (100A) (S200). Here, the creation of the external connection list regarding the network N1 is a process that can be performed by the master apparatus (100A) playing the role of the master in the network N1. The slave apparatus (100B) playing the role of the slave may not (directly) create the external connection list. This is because the slave apparatus (100B) may not carry out the direct communication via the second communication path with the slave apparatus (100C), which is another slave apparatus of the network N1. When the slave apparatus (100B) transmits the external connection list acquiring request to request the transmission of the external connection list to the master apparatus (100A) in step S200, the slave apparatus (100B) acquires the external connection list regarding the network N1.

The master apparatus (100A) receiving the external connection list acquiring request transmitted from the slave apparatus (100B) in step S200 creates the external connection list in reply to the external connection list acquiring request (S202: a process of creating the external connection list).

The master apparatus (100A) creates setting information by substituting the information of the information processing apparatus 100B by the information of the information processing apparatus 100A among the setting information shown in FIG. 9A, and includes the created setting information in the external connection list. The master apparatus (100A) creates the same passcode as that shown in FIG. 9B and further includes the created passcode in the external connection list. Hereinafter, an example will be described where the master apparatus (100A) creates the passcode in reply to the received external connection list acquiring request and includes the created passcode in the external connection list. Hereinafter, it will be described about an example where the passcode created by the master apparatus (100A) is a temporary passcode. The passcode in the process of the second example of the communication stabilization approach may be a unique passcode for the network N1 or may be a unique passcode for each of the information processing apparatuses 100 organizing the network N1.

The master apparatus (100A) creating the external connection list in step S202 transmits the external connection list to the slave apparatus (100B) (S204). The master apparatus (100A) transmits the temporary passcode created in step S202 to the slave apparatus (100C) (S206).

FIG. 11 shows the example where the master apparatus (100A) performs the process of step S206 after the process of step S204. However, the application is not limited thereto. For example, the master apparatus (100A) may separately perform the process of step S204 and the process of step S206. In the above case, the master apparatus (100A) may perform the process of step S204 after the process of step S206 or may perform the process of step S206 in synchronization with the start of the process of step S204.

When the master apparatus (100A) transmits the temporary passcode to the slave apparatus (100C) in step S206, the master apparatus (100A) disconnects the communication via the second communication path with the slave apparatus (100C) (S206: a process of disconnecting the second communication path).

The master apparatus (100A) performs a role switching process of switching the role of the network N1 with the slave apparatus (100B) (S210). In the process of step S210, the slave apparatus (100B) becomes a new master apparatus playing the role of the master apparatus of the network N1 and the master apparatus (100A) becomes a new slave apparatus playing the role of the slave.

Figure 12A:
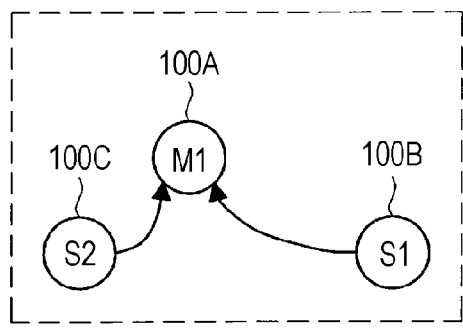
FIG. 12A is an explanatory diagram supplementarily illustrating an example of the process shown in FIG. 11.
Figure 12B:
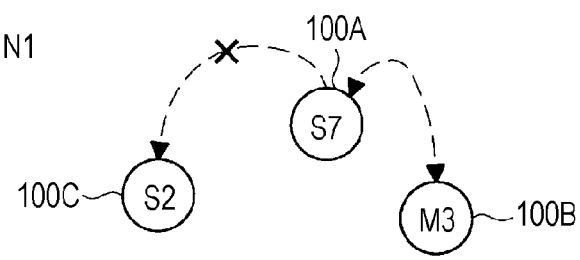
FIG. 12B is an explanatory diagram supplementarily illustrating an example of the process shown in FIG. 11.

By performing the above-described processes from step S200 to S210, the state (initial state) of the network N1 shown in FIG. 12A is changed to the state shown in FIG. 12B.

The slave apparatus (100B) becoming the new master apparatus of the network N1 in step S210 starts the communication via the second communication path with the slave apparatus (100C) (S212: a process of connecting the second communication path). Here, the slave apparatus (100B) can perform the process of step S212 by using the external connection list acquired in step S204.

Figure 12C:
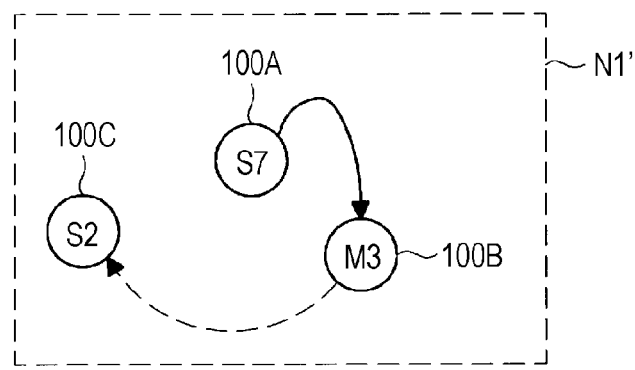
FIG. 12C is an explanatory diagram supplementarily illustrating an example of the process shown in FIG. 11.
Figure 12D:
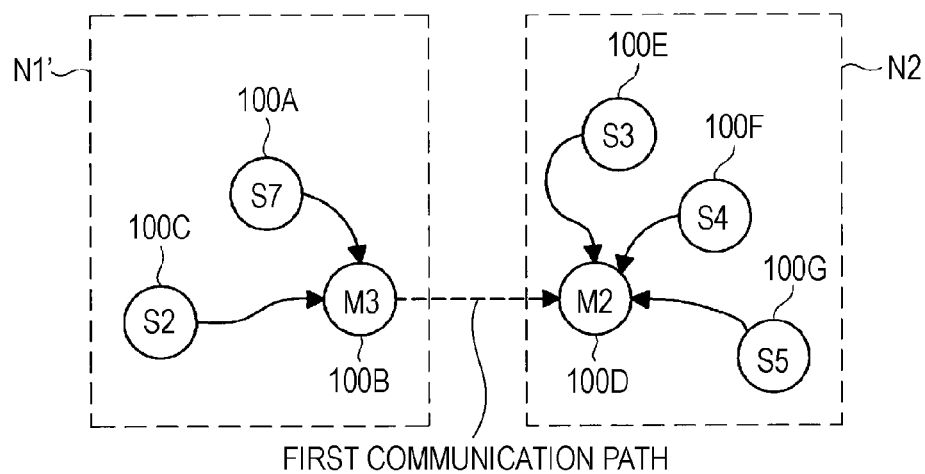
FIG. 12D is an explanatory diagram supplementarily illustrating an example of the process shown in FIG. 11.

By performing the process of step S212, the state shown in FIG. 12B is changed to a state shown in FIG. 12C, that is, a state where a new star-type network N1' in which the information processing apparatus 100 playing the role of the master is switched from the network N1.

Here, "a case (FIG. 12D) where the information processing apparatus 100B carries out the communication via the first communication path with the master apparatus (100D) of the network N2 via the first communication path after the new network N1'" corresponds to "the case (FIG. 3B) where the master apparatus of the first network carries out the communication with the master apparatus of the second network via the first communication path".

By performing the process of the first example of the same communication stabilization approach as that in FIG. 7, for example, after the processes from step S200 to step S212, two star-type networks can be integrated into one star-type network. In FIG. 11, the process corresponding to the process of the first example of the communication stabilization approach is omitted.

In the process of the second example of the communication stabilization approach according to an embodiment, the slave apparatus of the first network is switched to the new master apparatus. In the process of the second example of the communication stabilization approach, the switched new master apparatus in the first network carries out the communication via the first communication path with the master apparatus of the second network. That is, in the process of the second example of the communication stabilization approach, the same process as the process of the first example of the communication stabilization approach is carried out between the information processing apparatuses 100 organizing the first network and the information processing apparatuses 100 organizing the second network. Therefore, by performing the process of the second example of the communication stabilization approach, like the process of the first example of the communication stabilization approach, it is possible to reduce the possibility that unintended communication failure occurs, compared to the case of the scatternet or the case where the technology according to the known example is used. Since the complexity of the process related to the communication is further reduced by the process of the second example of the communication stabilization approach, compared to the case of the scatternet, it is possible to more easily realize an application using the communication via the second communication path between the information processing apparatuses, for example.

By performing the processes of the second example of the communication stabilization approach according to the embodiment, it is possible to carry out more stable communication between any of the information processing apparatuses organizing the integrated network, as well as the communication between the information processing apparatuses belonging to the different star-type networks.

[3] Third Example of Process Related to Communication Stabilization Approach

In the processes of the first and second examples of the communication stabilization approach, the master apparatus (including the master apparatus after the role is switched) of the first network carries out the communication via the first communication path with the master apparatus of the second network. However, the process related to the communication stabilization approach according to an embodiment is not limited to the processes in the case where the master apparatus of the first network carries out the communication via the first communication path with the master apparatus of the second network. Next, as a process of a third example of the communication stabilization approach according to an embodiment, a process performed by the master apparatus of the first network to carry out the communication via the first communication path with the slave apparatus of the second network will be exemplified.

Figure 13:
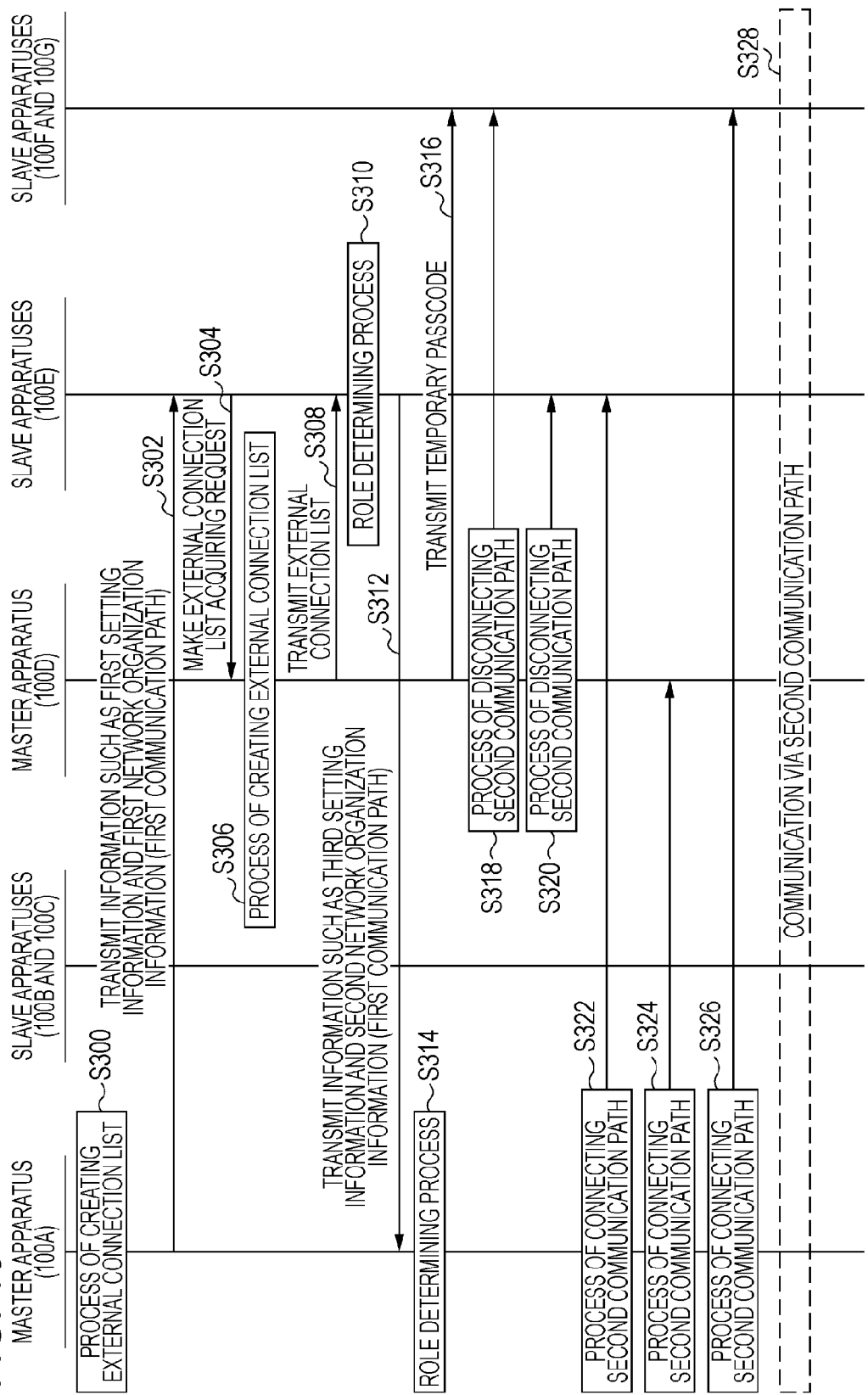
FIG. 13 is an explanatory diagram illustrating a third example of the process (communication method) related to the communication stabilization approach according to an embodiment.

FIG. 13 is an explanatory diagram illustrating the third example of the process (communication method) related to the communication stabilization approach according to an embodiment. Here, FIG. 13 shows an example of a process (the process related to the communication stabilization approach) when the master apparatus M1 (the information processing apparatus 100A) of the network N1 shown in FIG. 3A carries out the communication via the first communication path with the slave apparatus S3 (the information processing apparatus 100E) of the network N2.

Figure 14A:
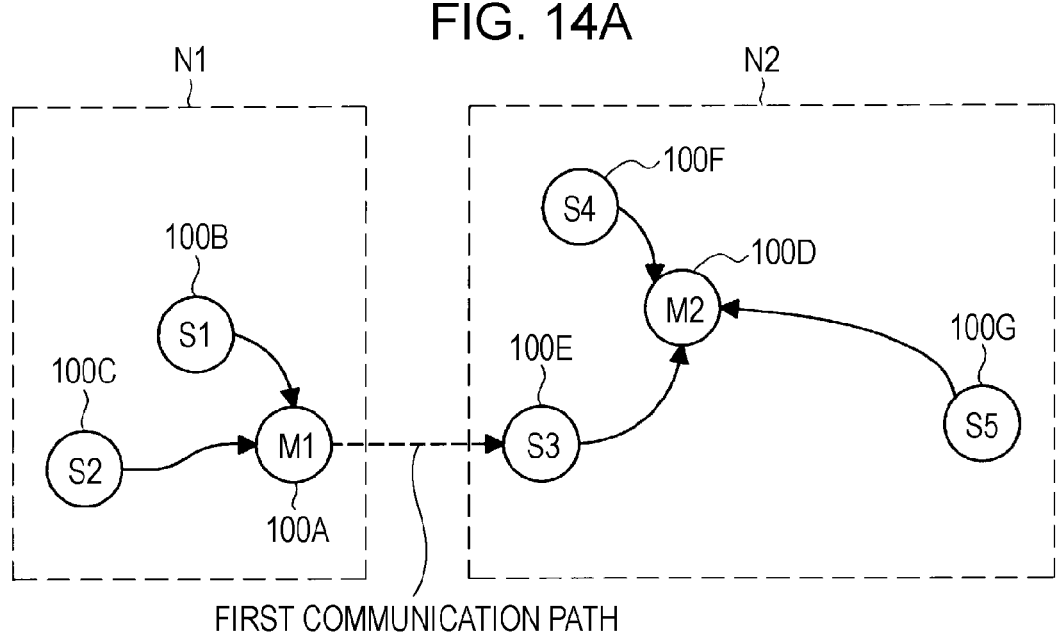
FIG. 14A is an explanatory diagram supplementarily illustrating an example of the process shown in FIG. 13.
Figure 14B:
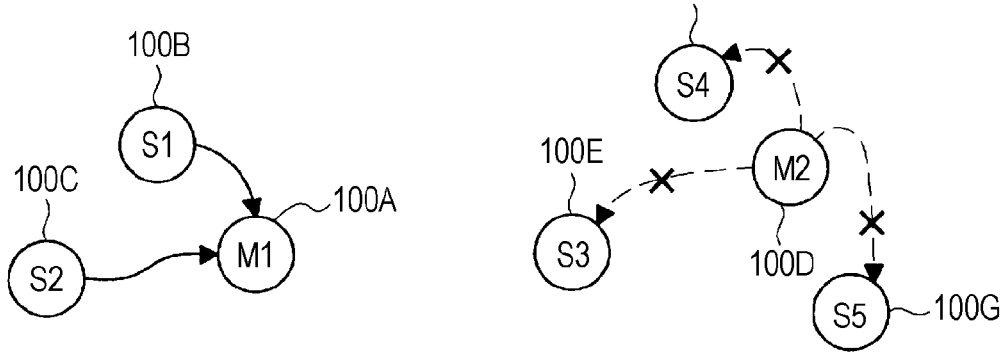
FIG. 14B is an explanatory diagram supplementarily illustrating an example of the process shown in FIG. 13.
Figure 14C:
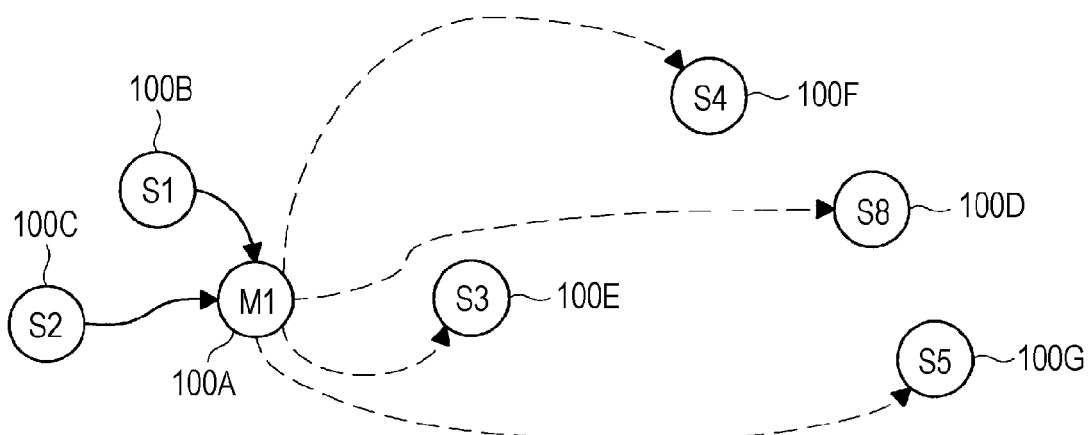
FIG. 14C is an explanatory diagram supplementarily illustrating an example of the process shown in FIG. 13.

FIGS. 14A to 14C are explanatory diagrams supplementarily illustrating an example of the process shown in FIG. 13. Hereinafter, the third example of the process related to the communication stabilization approach will be described appropriately with reference to FIGS. 14A to 14C.

In the third example of the process related to the communication stabilization approach described with reference to FIG. 13, the master apparatus of the network N1 is referred to as the "the master apparatus (100A)" and the slave apparatuses of the network N1 are referred to as the "slave apparatuses (100B and 100C)". In the third example of the process related to the communication stabilization approach described with reference to FIG. 13, the master apparatus of the network N2 is referred to as the "master apparatus (100D)". In the third example of the process related to the communication stabilization approach described with reference to FIG. 13, the slave apparatus S3 of the network N2 is referred to as the "slave apparatus (100E)" and the slave apparatuses S4 and S5 of the network N2 are referred to as the "slave apparatuses (100F and 100G)".

The master apparatus (100A) creates the external connection list related to the first network, as in step S100 of FIG. 7 (S300: a process of creating the external connection list).

When the master apparatus (100A) performs the process of creating the external connection list in step S300, the master apparatus (100A) transmits information such as the first setting information and the first network organization information to the slave apparatus (100E) via the first communication path, as in step S102 of FIG. 7 (S302, FIG. 14A).

The slave apparatus (100E) receiving the information transmitted from the master apparatus (100A) via the first communication path in step S302 transmits the external connection list acquiring request to the master apparatus (100D) as in step S200 of FIG. 11 (S304).

The master apparatus (100D) receiving the external connection list acquiring request transmitted from the slave apparatus (100E) in step S304 creates the external connection list in reply to the external connection list acquiring request (S306: a process of creating the external connection list).

FIGS. 15A and 15B are explanatory diagrams illustrating an example of the external connection list according to an embodiment. FIG. 15A shows an example of setting information used for an external apparatus to make connection to the information processing apparatuses 100D, 100F, and 100G organizing the network N2 via the second communication path and shows a case where the setting information is the BD address. FIG. 15B shows an example of the passcode used for the authentication when the communication via the second communication path is carried out with the information processing apparatuses 100E, 100F, and 100G organizing the network N2. FIG. 15B shows the example where the master apparatus (100D) creates the common passcode of the information processing apparatuses 100D, 100F, and 100G. However, the application is not limited thereto. For example, the master apparatus (100D) may create a unique passcode of each address shown in FIG. 15A. Hereinafter, a case will be described where the passcode created by the master apparatus (100D) is a temporary passcode.

As shown in FIG. 15A, the master apparatus (100D) creates the external connection list including the setting information used for the external apparatus to carry out the communication with the information processing apparatuses 100 organizing the network N2 other than the slave apparatus (100E) receiving the first setting information and the first network organization information.

The master apparatus (100D) creating the external connection list in step S304 transmits the external connection list to the slave apparatus (100E) (S308).

The slave apparatus (100E) receiving the external connection list transmitted from the master apparatus (100D) in step S308 performs the role determining process as in step S106 of FIG. 7 (S310). Hereinafter, a case will be described where the slave apparatus (100E) is determined to play the role of the slave in the communication via the second communication path with the master apparatus (100A) in step S310.

FIG. 13 shows the example where the slave apparatus (100E) performs the process of step S310 after the process of step S304. However, the application is not limited thereto. For example, the slave apparatus (100E) may separately perform the process of step S304 and the process of step S310. In the above case, the slave apparatus (100E) may perform the process of step S304 after the process of step S310 or may perform the process of step S310 in synchronization with the start of the process of step S304.

The slave apparatus (100E) receiving the external connection list transmitted from the master apparatus (100D) in step S308 transmits information such as third setting information and the second network organization information to the master apparatus (100A) via the first communication path (S312).

Here, the information transmitted in step S312 corresponds to the information shown in FIG. 4, for example. The third setting information transmitted in step S312 corresponds to the setting information 182 shown in FIG. 4. The second network organization information transmitted in step S312 corresponds to the setting information 184 shown in FIG. 4. The second network organization information includes the external connection list transmitted from the master apparatus (100D) in step S308.

The master apparatus (100A) receiving the information transmitted from the slave apparatus (100E) via the first communication path in step S314 performs the role determining process on the basis of the received information as in step S110 of FIG. 7 (S314). Hereinafter, a case will be described where the master apparatus (100A) is determined to play the role of the master in the communication via the second communication path with each of the information processing apparatuses 100 of the network N2 in step S314.

The master apparatus (100D) transmitting the external connection list in step S308 transmits the temporary passcode created in step S306 to the slave apparatuses (100F and 100G) (S316). Subsequently, the master apparatus (100D) disconnects the communication via the second communication path with the slave apparatuses (100F and 100G) (S318: a process of disconnecting the second communication path). The master apparatus (100D) also disconnects the communication via the second communication path with the slave apparatus (100E) (S320: a process of disconnecting the second communinication path). The sequence of the processes of step S318 and S320 performed by the master apparatus (100D) is not limited to the example shown in FIG. 13.

By performing the processes from step S318 to S320 performed by the master apparatus (100D), the state shown in FIG. 14A is changed to the state shown in FIG. 14B.

The master apparatus (100A) determined to play the role of the master in step S314 starts the communication via the second communication path with each of the slave apparatus (100E), the master apparatus (100D), and the slave apparatuses (100F and 100G) (S322 to S326: a process of connecting the second communication path). Here, since the master apparatus (100A) permits the master apparatus (100D) of the network N2 to ensure time to perform the processes of steps S316 to S320, the processes of steps S322 to S326 are performed after expiration of a predetermined time after the completion of the process of step S314. However, the application is not limited thereto. The sequence of the processes of steps S322 to S326 performed by the master apparatus (100A) is not limited to the example shown in FIG. 13.

By performing the processes of steps S322 to S326 performed by the master apparatus (100A), the state shown in FIG. 14B is changed to a state shown in FIG. 14C, that is, a state where the networks N1 and N2 are integrated into one star-type network.

By performing the process of steps S300 to the process of step S326 between the information processing apparatuses 100 organizing the first network and the information processing apparatuses 100 organizing the second network, two star-type networks are integrated into one star-type network.

As a consequence, it is possible to realize the communication via the second communication path between any of the information processing apparatuses among the master apparatus (100A), the slave apparatuses (100B and 100C), the master apparatus (100D), the slave apparatus (100E), and the slave apparatuses (100F and 100G) (S328).

In this way, by performing the processes shown in FIG. 13, it is possible to integrate two star-type networks into one star-type network between the information processing apparatuses 100 organizing the first network and the information processing apparatuses 100 organizing the second network. Therefore, through the processes of the third example of the communication stabilization approach shown in FIG. 13, like the processes of the first example of the communication stabilization approach, it is possible to reduce the possibility that unintended communication failure occurs, compared to the case of the scatternet or the case where the technology according to the known example is used. Moreover, since the complexity of the processes related to the communication is reduced by the processes of the third example of the communication stabilization approach in comparison to the case of the scatternet, it is possible to more easily realize an application, such as a game using the communication via the second communication path, using the communication via the second communication path between the information processing apparatuses.

By performing the processes of the third example of the communication stabilization approach according to an embodiment, it is possible to carry out more stable communication between any of the information processing apparatuses organizing the integrated network, as well as communication between the information processing apparatuses belonging to the different star-type networks.

[4] Fourth Example of Process Related to Communication Stabilization Approach

Through the processes of the third example of the communication stabilization approach, the slave apparatus of the second network carries out the communication via the first communication path with the master apparatus of the first network. For example, the slave apparatus transmits the network organization information 184 including the external connection list shown in FIG. 4. However, the information transmitted in the communication via the first communication path from the slave apparatus of the second network to the master apparatus of the first network is not limited to the information including the network organization information 184 shown in FIG. 4. Next, as a process of a fourth example of the communication stabilization approach according to the embodiment, another process performed by the master apparatus of the first network to carry out the communication via the first communication path with the slave apparatus of the second network will be described.

FIG. 16 is an explanatory diagram illustrating the fourth example of the process (communication method) related to the communication stabilization approach according to the embodiment. Here, FIG. 16 shows an example of a process (the process related to the communication stabilization approach) when the master apparatus M1 (the information processing apparatus 100A) of the network N1 shown in FIG. 3A carries out the communication via the first communication path with the slave apparatus S3 (the information processing apparatus 100E) of the network N2, as in FIG. 13.

In the fourth example of the process related to the communication stabilization approach described with reference to FIG. 16, the master apparatus of the network N1 is referred to as the "the master apparatus (100A)" and the slave apparatuses of the network N1 are referred to as the "slave apparatuses (100B and 100C)". In the fourth example of the process related to the communication stabilization approach described with reference to FIG. 16, the master apparatus of the network N2 is referred to as the "master apparatus (100D)". In the fourth example of the process related to the communication stabilization approach described with reference to FIG. 16, the slave apparatus S3 of the network N2 is referred to as the "slave apparatus (100E)" and the slave apparatuses S4 and S5 of the network N2 are referred to as the "slave apparatuses (100F and 100G)".

The master apparatus (100A) creates the external connection list related to the first network, as in step S100 of FIG. 7 (S400: a process of creating the external connection list).

When the master apparatus (100A) performs the process of creating the external connection list in step S400, the master apparatus (100A) transmits information such as the first setting information and the first network organization information to the slave apparatus (100E) via the first communication path, as in step S102 of FIG. 7 (S402).

The slave apparatus (100E) receiving the information transmitted from the master apparatus (100A) via the first communication path in step S402 performs the role determining process as in step S106 of FIG. 7 (S404). Hereinafter, a case will be described where the slave apparatus (100E) is determined to play the role of the slave in the communication via the second communication path with the master apparatus (100A) in step S404.

When the slave apparatus (100E) performs the process of step S404, the slave apparatus (100E) transmits information such as the third setting information and the third network organization information to the master apparatus (100A) via the first communication path (S406).

Here, the information transmitted in step S406 corresponds to the information shown in FIG. 5. The third setting information transmitted in step S406 corresponds to the setting information 182 shown in FIG. 5. The third network organization information transmitted in step S406 corresponds to the setting information 194 shown in FIG. 5. That is, the third network organization information transmitted in step S406 does not include the external connection list regarding the network N2 but includes a subsequent list flag indicating that the external connection list shown in the payload 196 of FIG. 5 is transmitted later.

The master apparatus (100A) receiving the information transmitted from the slave apparatus (100E) via the first communication path in step S406 performs the role determining process on the basis of the received information as in step S110 of FIG. 7 (S408). Hereinafter, a case will be described where the master apparatus (100A) is determined to play the role of the master in the communication via the second communication path with each of the information processing apparatuses 100 of the network N2 in step S408.

When the slave apparatus (100E) transmits the information to the master apparatus (100A) in the communication via the first communication path in step S406, the slave apparatus (100E) transmits the external connection list acquiring request to the master apparatus (100D) as in step S200 of FIG. 11 (S410).

The master apparatus (100D) receiving the external connection list acquiring request transmitted from the slave apparatus (100E) in step S410 creates the external connection list in reply to the external connection list acquiring request as in step S306 of FIG. 13 (S412: a process of creating the external connection list). Hereinafter, a case will be described where the passcode created in step S412 by the master apparatus (100D) is a temporary passcode.

The master apparatus (100D) creating the external connection list in step S412 transmits the external connection list to the slave apparatus (100E) (S414).

The master apparatus (100D) transmitting the external connection list in step S414 transmits the temporary passcode created in step S412 to the slave apparatuses (100F and 100G) (S416). Subsequently, the master apparatus (100D) disconnects the communication via the second communication path with the slave apparatuses (100F and 100G) (S418: a process of disconnecting the second communication path). The master apparatus (100D) also disconnects the communication via the second communication path with the slave apparatus (100E) (S420: a process of disconnecting the second communication path). The sequence of the processes of step S418 and S420 performed by the master apparatus (100D) is not limited to the example shown in FIG. 16.

The master apparatus (100A) determined to play the role of the master in step S408 starts the communication via the second communication path with the slave apparatus (100E) (S422: a process of connecting the second communication path). Here, since the master apparatus (100A) permits the master apparatus (100D) of the network N2 to ensure time to perform the processes of steps S412 to S420, the process of step S422 is performed after expiration of a predetermined time after the completion of the process of step S408. However, the application is not limited thereto.

By performing the process of step S422, the master apparatus (100A) and the slave apparatus (100E) become a communicable state via the second communication path. When the slave apparatus (100E) becomes the communicable state, the slave apparatus (100E) transmits the external connection list acquired from the master apparatus (100D) in step S414 to the master apparatus (100A) (S424).

The master apparatus (100A) starts the communication via the second communication path with each of the master apparatus (100D) and the slave apparatuses (100F and 100G) (S426 and S428: a process of connecting the second communication path). Here, the master apparatus (100A) can perform the processes of steps S426 and S428 by using the external connection list transmitted from the slave apparatus (100E) in step S424. The sequence of the processes of step S426 and S428 performed by the master apparatus (100A) is not limited to the example shown in FIG. 16.

By performing the processes of steps S422, S426, and S428 by the master apparatus (100A), the master apparatus (100A) of the network N1 and each of the information processing apparatuses 100 of the network N2 are connected to each other via the second communication path. That is, the networks N1 and N2 are integrated into one star-type network, as shown in FIG. 14C.

By performing the process of steps S400 to the process of step S428 between the information processing apparatuses 100 organizing the first network and the information processing apparatuses 100 organizing the second network, two star-type networks are integrated into one star-type network.

As a consequence, it is possible to realize the communication via the second communication path between any of the information processing apparatuses among the master apparatus (100A), the slave apparatuses (100B and 100C), the master apparatus (100D), the slave apparatus (100E), and the slave apparatuses (100F and 100G) (S430).

In this way, by performing the processes shown in FIG. 16, it is possible to integrate two star-type networks into one star-type network between the information processing apparatuses 100 organizing the first network and the information processing apparatuses 100 organizing the second network. Therefore, through the processes of the fourth example of the communication stabilization approach shown in FIG. 16, as in the first example of the communication stabilization approach, it is possible to reduce the possibility that unintended communication failure occurs, compared to the case of the scatternet or the case where the technology according to the known example is used. Moreover, since the complexity of the processes related to the communication is reduced by the processes of the fourth example of the communication stabilization approach in comparison to the case of the scatternet, it is possible to more easily realize an application, such as a game using the communication via the second communication path, using the communication via the second communication path between the information processing apparatuses.

By performing the processes of the fourth example of the communication stabilization approach according to the embodiment, it is possible to carry out more stable communication between any of the information processing apparatuses information processing apparatus organizing the integrated network, as well as the communication between the information processing apparatuses belonging to different star-type networks.

[5] Fifth Example of Process Related to Communication Stabilization Approach

In the processes of the first and second examples of the communication stabilization approach, the master apparatus of the first network carries out communication via the first communication path with the master apparatus of the second network. In the processes of the third and fourth examples of the communication stabilization approach, the master apparatus of the first network carries out the communication via the first communication path with the slave apparatus of the second network. The process related to the communication stabilization approach according to the embodiment is not limited to the first to fourth examples. Next, as a process of a fifth example of the communication stabilization approach according to the embodiment, a process performed by the slave apparatus of the first network to carry out the communication via the first communication path with the slave apparatus of the second network will be exemplified.

Figure 17A:
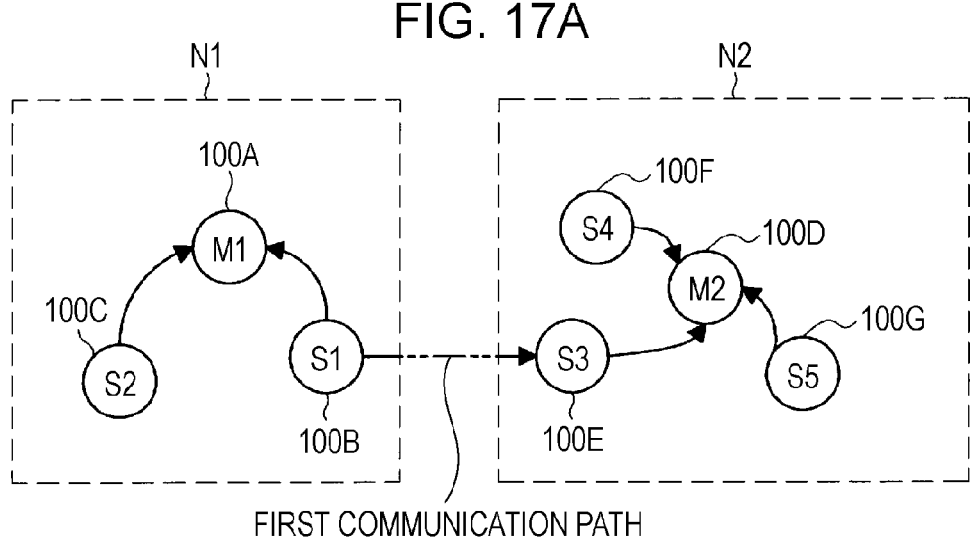
FIG. 17A is an explanatory diagram illustrating a fifth example of a process (communication method) related to the communication stabilization approach according to an embodiment.
Figure 17B:
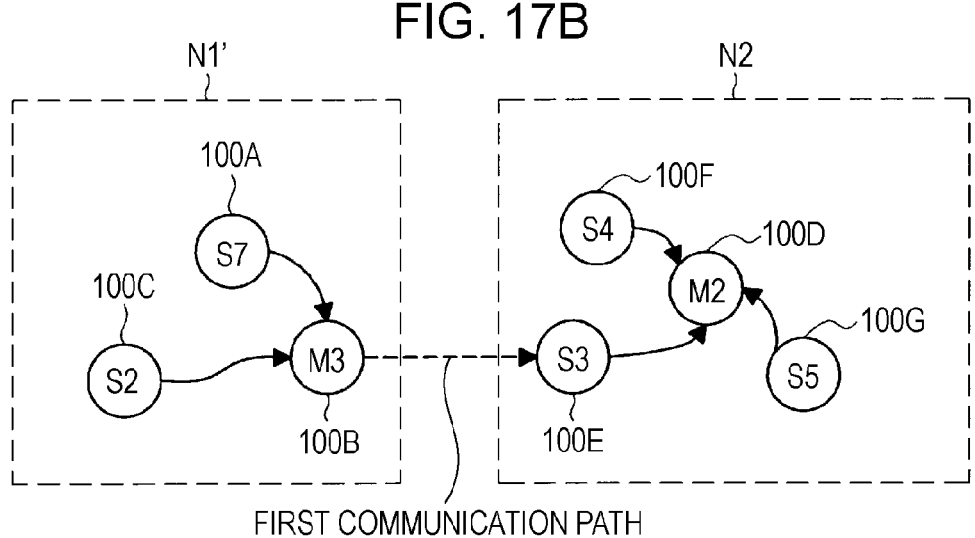
FIG. 17B is an explanatory diagram illustrating the fifth example of a process (communication method) related to the communication stabilization approach according to an embodiment.
Figure 17C:
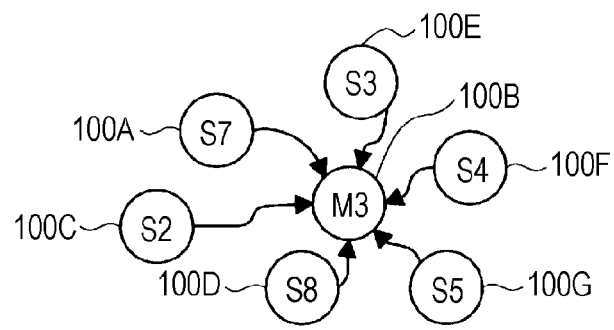
FIG. 17C is an explanatory diagram illustrating the fifth example of a process (communication method) related to the communication stabilization approach according to an embodiment.

FIGS. 17A to 17C are explanatory diagrams illustrating the fifth example of a process (communication method) related to the communication stabilization approach according to the embodiment.

When the slave apparatus S1 (the information processing apparatus 100B) of the network N1 carries out the communication via the first communication path with the slave apparatus S3 of the network N2, as in FIG. 17A, the role switching process of permitting the slave apparatus S1 to function as the master apparatus is performed in the network N1. More specifically, the process of the second example of the communication stabilization approach shown in FIG. 11, for example, is performed in the network N1. By performing the process of the second example of the communication stabilization approach shown in FIG. 11, for example, in the network N1, the information processing apparatus 100B is switched to the master apparatus in the network N1', as shown in FIG. 17B.

The state shown in FIG. 17B corresponds to the state where the master apparatus of the first network carries out the communication via the first communication path with the slave apparatus of the second network. Therefore, by performing the processes of the third example (or the fourth example) of the communication stabilization approach between the information processing apparatuses 100 organizing the network N1' and the information processing apparatuses 100 organizing the network N2, it is possible to realize the state shown in FIG. 17C.

When the slave apparatus of the first network carries out the communication via the first communication path with the slave apparatus of the second network, the process is performed by combining the process of the second example and the process of the third example (or the fourth example). In this way, as shown in FIGS. 17A to 17C, it is possible to integrate two star-type networks into one star-type network. Therefore, by performing the process of the fifth example of the communication stabilization approach, as in the process of the first example of the communication stabilization approach, it is possible to reduce the possibility that unintended communication failure occurs, compared to the case of the scatternet or the case where the technology according to the known example is used. Moreover, since the complexity of the processes related to the communication is reduced by the processes of the fifth example of the communication stabilization approach in comparison to the case of the scatternet, it is possible to more easily realize an application, such as a game using the communication via the second communication path, using the communication via the second communication path between the information processing apparatuses.

By performing the processes of the fifth example of the communication stabilization approach according to the embodiment, it is possible to carry out more stable communication between any of the information processing apparatuses organizing the integrated network, as well as communication between the information processing apparatuses belonging to the different star-type networks.

According to an embodiment, the processes of the first to fifth examples are selectively performed in accordance with a combination of the roles of the information processing apparatuses 100 carrying out the communication via the first communication path between the first and second networks. Here, by performing the processes of the first to fifth examples, it is possible to integrate two star-type networks into one star-type network, as described above. As described above, by repeating the processes (for example, the processes of the first to fifth examples) of integrating two star-type networks into one star-type network, it is possible to integrate three or more star-type networks into one star-type network. Therefore, by performing the above-described processes of the first to fifth examples of the communication stabilization approach to integrate the plurality of star-type networks into one star-type network, it is possible to realize more stable communication between the information processing apparatuses belonging to the different star-type networks. Moreover, the processes related to the communication stabilization approach according to the an embodiment are not limited to the first to fifth examples.

Information Processing Apparatus According to Embodiment

Next, will be described an example of the configuration of the information processing apparatus 100 according to an embodiment capable of realizing the communication method (the process related to the communication stabilization approach) according to the above-described embodiment.

Figure 18:
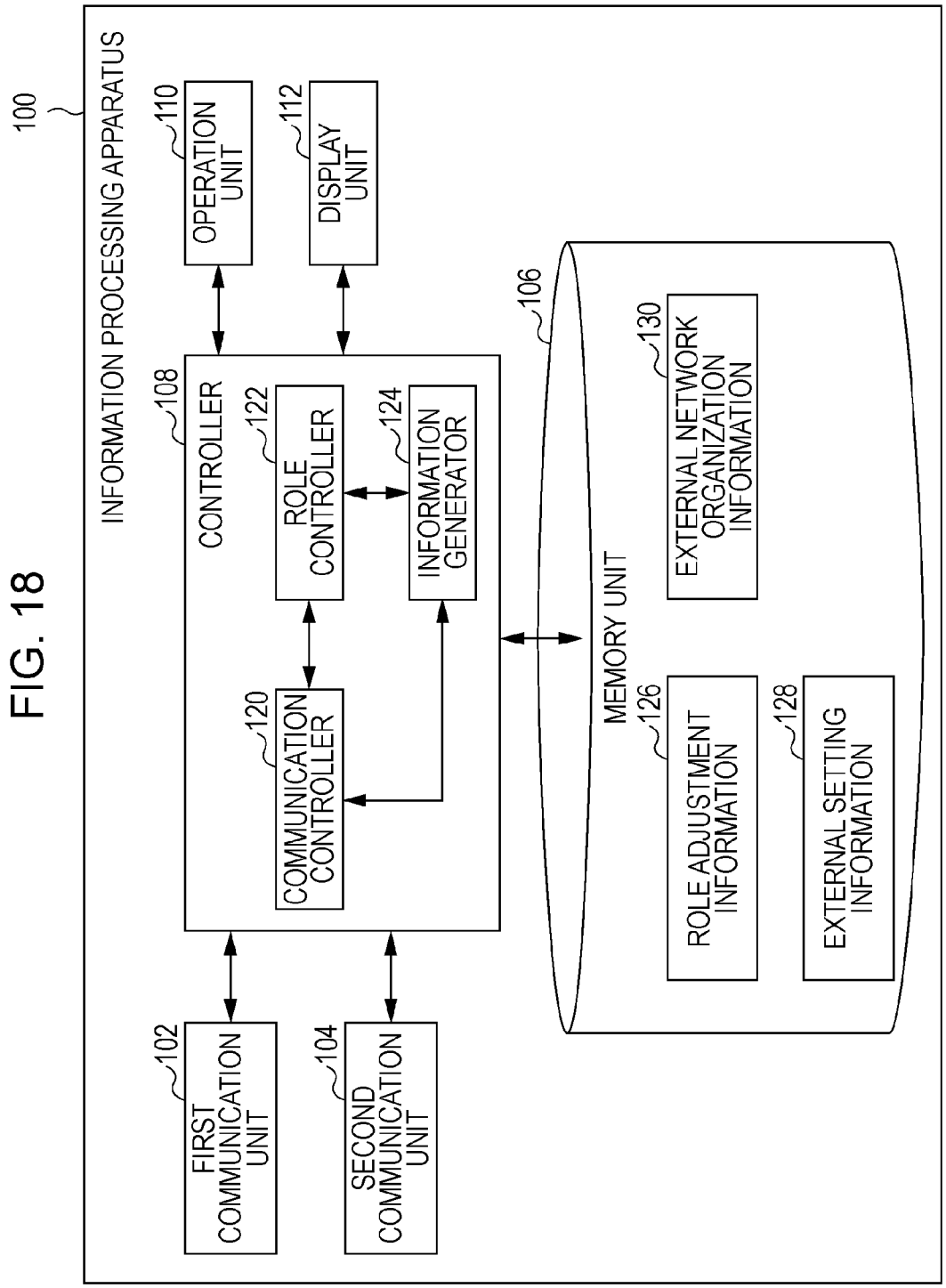
FIG. 18 is an explanatory diagram illustrating an example of the configuration of the information processing apparatus according to an embodiment.

FIG. 18 is an explanatory diagram illustrating an example of the configuration of the information processing apparatus 100 according to an embodiment. The information processing apparatus 100 includes a first communication unit 102, a second communication unit 104, a memory unit 106, a controller 108, an operation unit 110, and a display unit 112.

The information processing apparatus 100 may include a ROM (Read-Only Memory which is not shown) or a RAM (Random Access Memory which is not shown). In the information processing apparatus 100, constituent elements are connected to each other via a bus serving as a data transmission path.

The ROM (not shown) stores programs executed by the controller 108 or control data such as calculation parameters. The RAM (not shown) primarily stores the programs executed by the controller 108.

Example of Hardware Configuration of Information Processing Apparatus 100

Figure 19:
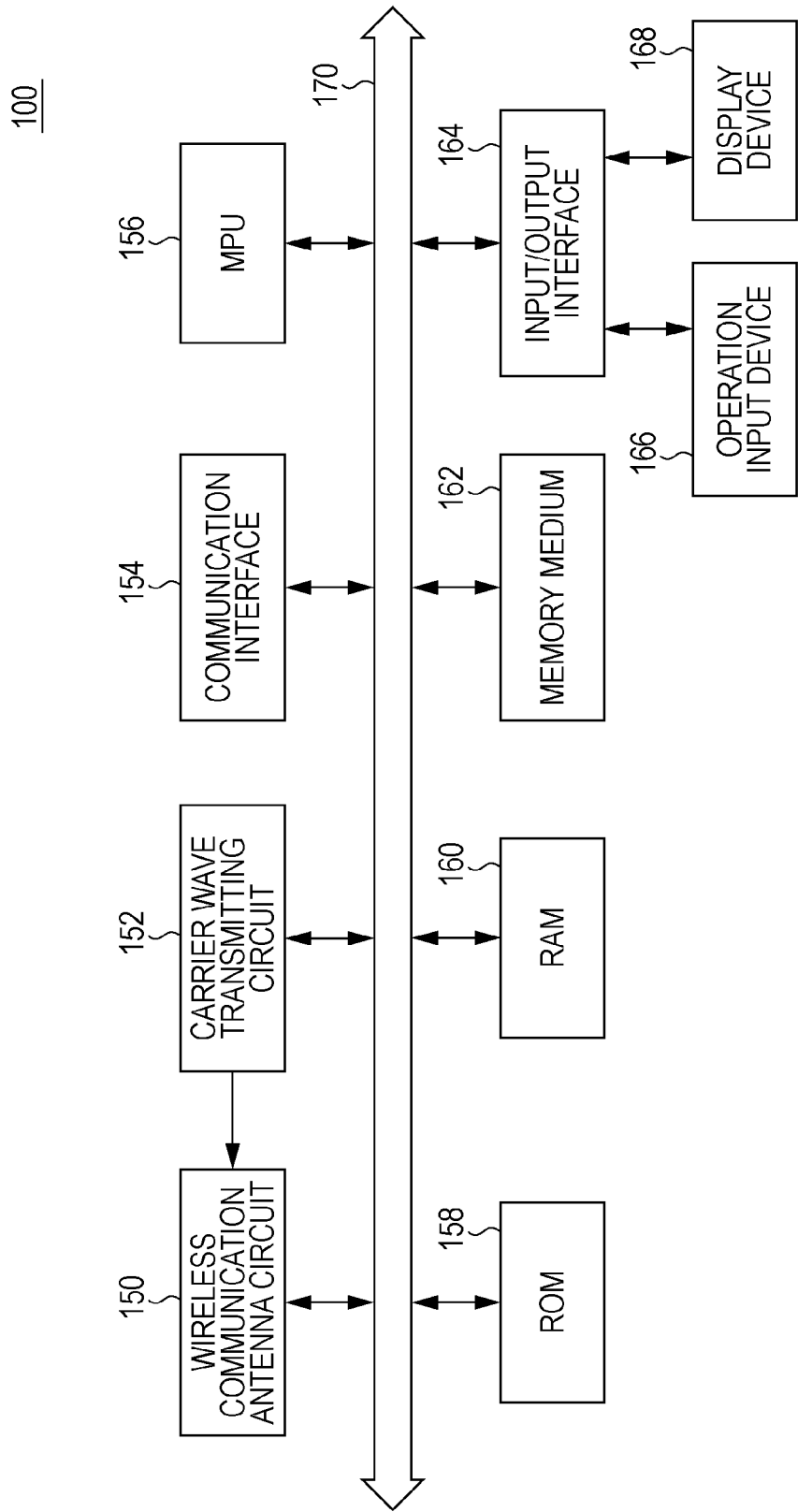
FIG. 19 is an explanatory diagram illustrating an example of the hardware configuration of the information processing apparatus according to an embodiment.

FIG. 19 is an explanatory diagram illustrating an example of the hardware configuration of the information processing apparatus 100 according to the embodiment. Referring to FIG. 19, for example, the information processing apparatus 100 includes a wireless communication antenna circuit 150, a carrier wave transmitting circuit 152, a communication interface 154, an MPU 156, a ROM 158, a RAM 160, a memory medium 162, an input/output interface 164, an operation input device 166, and a display device 168. In the information processing apparatus 100, the constituent elements are connected to each other via a bus 170 serving as a data transmission path.

The wireless communication antenna circuit 150 is the first communication unit included in the information processing apparatus 100 and is in charge of forming the first communication path with an external apparatus (for example, another information processing apparatus 100, and the same is applied below). The wireless communication antenna circuit 150 includes a resonant circuit having a coil with predetermined inductance as a transceiver antenna and a capacitor with predetermined capacitance and a demodulation circuit. The wireless communication antenna circuit 150 receives a magnetic field of, for example, 13.56 MHz (hereinafter, referred to as "first carrier waves") to demodulate various kinds of data transmitted from an external apparatus and included in the information shown in FIG. 4 or 5, for example. With such a configuration, the wireless communication antenna circuit 150 demodulates the first carrier waves transmitted from the external apparatus to acquire the information shown in FIG. 4 or 5, for example.

The carrier wave transmitting circuit 152 includes a modulation circuit performing ASK (Amplitude Shift Keying) modulation, for example, and an amplification circuit amplifying the output of the modulation circuit. The carrier wave transmitting circuit 152 transmits the first carrier waves containing a carrier wave signal from the transceiver antennas of the wireless communication antenna circuit 150. The information processing apparatus 100 including the carrier wave transmitting circuit 152 can have a so-called reader/writer function. Here, an example of the carrier wave signal transmitted from the wireless communication antenna circuit 150 by the carrier wave transmitting circuit 152 includes a signal representing information shown in FIG. 4 or the information shown in FIG. 5. The transmission of the carrier waves of the carrier wave transmitting circuit 152 is controlled by the MPU 156.

The wireless communication antenna circuit 150 and the carrier wave transmitting circuit 152 function as the first communication unit 102 forming the first communication path in the information processing apparatus 100. FIG. 19 shows the configuration in which the first communication path is formed by NFC, but the application is not limited thereto. For example, when the first communication path is formed by infrared communication, the information processing apparatus 100 may include an infrared communication port and a transceiver circuit.

The communication interface 154 is a second communication unit of the information processing apparatus 100 and serves as the second communication unit 104. The communication interface 154 functions as a communication interface forming the second communication path in the information processing apparatus 100. Here, examples of the communication interface 154 include an IEEE 802.15.1 port and a transceiver circuit, but the application is not limited thereto. For example, the information processing apparatus 100 may include a communication interface of any communication method capable of forming a star-type network using the frequency hopping spread spectrum as the communication interface 154.

The MPU 156 includes a MPU (Micro processing unit) or an integrated circuit in which a plurality of circuits is integrated to realize a control function. The MPU 156 functions as the controller 108 controlling the entire information processing apparatus 100. The MPU 156 may serve as a communication controller 120, a role controller 122, and an information creator 124, which are described below, in the information processing apparatus 100.

The ROM 158 stores programs executed by the MPU 156 or control data such as calculation parameters. The RAM 160 primarily stores the programs, for example, executed by the MPU 156.

The memory medium 162 functions as the memory unit 106. For examples, the memory medium 162 stores various data such as the role adjustment information, the setting information (data) acquired from an external apparatus, the network organization information (data) acquired from an external apparatus, an application. Hereinafter, the setting information acquired from an external apparatus is also termed "external setting information. The network organization information acquired from an external apparatus is also termed "external network organization information". Here, examples of the memory medium 162 include a magnetic recording medium such as a hard disk and non-volatile memory such as an EEPROM (Electrically Erasable and Programmable Read Only memory), a flash memory, a MRAM (Magnetoresistive Random Access Memory), a FeRAM (Ferroelectric Random Access Memory), or a PRAM (Phase change Random Access Memory). However, the application is not limited thereto.

The input/output interface 164 is connected to the operation input device 166 or the display device 168, for example. The operation input device 166 functions as the operation unit 110. The display device 168 functions as the display unit 112. Here, examples of the input/output interface 164 include a USB (Universal Serial Bus) terminal, a DVI (Digital Visual Interface) terminal, an HDMI (High-Definition Multimedia Interface) terminal, and various processing circuits. However, the application is not limited thereto. Since the operation input device 166 can be mounted on the information processing apparatus 100, for example, the operation input device 166 is connected to the input/output interface 164 inside the information processing apparatus 100. Examples of the operation input device 166 include a button, a direction key, a rotational selection device such as a jog dial, or a combination thereof. However, the application is not limited thereto. Since the display device 168 is mounted on the information processing apparatus 100, for example, the display device 168 is connected to the input/output interface 164 inside the information processing apparatus 100. Examples of the display device 168 include an LCD (Liquid Crystal Display) and an organic EL display (also called an organic ElectroLuminance display or an OLED (Organic Light Emitting Diode display). However, the application is not limited thereto. Of course, the input/output interface 164 can be connected to an operation input device (for example, a keyboard or a mouse) serving as an external device of the information processing apparatus 100 or a display device (for example, an external display).

The information processing apparatus 100 having the configuration shown in FIG. 19, for example, performs processes related to the process (the communication process via the first communication path) of (B-1) to the process (the connection process via the second communication path) of (D-1) to realize the communication stabilization approach according to the above-described embodiment.

The hardware configuration of the information processing apparatus 100 according to the embodiment is not limited to the configuration shown in FIG. 19. For example, the information processing apparatus 100 according to the embodiment may include a DSP (Digital Signal Processor), an amplifier, or a voice output device including a speaker.

The constituent elements of the information processing apparatus 100 will be described again with reference to FIG. 18. The first communication unit 102 is the first communication unit of the information processing apparatus 100 and performs the communication via the first communication path with an external apparatus. Here, the first communication unit 102 carries out non-contact type communication, such as NFC, using carrier waves with a predetermined frequency with an external apparatus. However, the application is not limited thereto.

The information processing apparatus 100 including the first communication unit 102 transmits information such as the information shown in FIG. 4 or the information shown in FIG. 5 to an external apparatus via the first communication path, and thus can acquires information such as the information shown in FIG. 4 or the information shown in FIG. 5 from the external apparatus. That is, the information processing apparatus 100 including the first communication unit 102 can acquire the information (for example, the setting information or the external connection list) used to carry out the communication via the second communication path with any information processing apparatus 100 organizing another star-type network.

The second communication unit 104 is the second communication unit of the information processing apparatus 100 and performs communication with an external apparatus via the second communication path different from the first communication path. Here, the second communication unit 104 can perform the communication with the external apparatus by the wireless communication of IEEE 802.15.1. However, the application is not limited thereto. The information processing apparatus 100 including the second communication unit 104 can form the star-type network together with the external apparatus.

The memory unit 106 is a memory unit of the information processing apparatus 100. Here, examples of the memory unit 106 include a magnetic recording medium such as a hard disk and a non-volatile memory such as a flash memory. However, the application is not limited thereto.

The memory unit 106 stores various data such as the role adjustment information, the external setting information, the external network organization information, an application. FIG. 18 shows the example where the role adjustment information 126, the external setting information 128, and the external network organization information 130 are stored in the memory unit 106. However, the application is not limited thereto. For example, the memory unit 106 can store the plurality of external setting information and the plurality of external network organization information each corresponding to the external setting information. Moreover, the memory unit 106 may store information (for example, network organization information corresponding to the network belonging to the information processing apparatus) created by the information creator 124, which is described below.

The controller 108 includes an MPU or an integrated circuit in which various processing circuits are integrated. The controller 108 controls the entire information processing apparatus 100. The controller 108 includes the communication controller 120, the role controller 122, and the information creator 124. The controller 108 having the above configuration mainly performs the processes (for example, the processes of the above-described first to fifth examples) related to the communication stabilization approach according to the above-described embodiment.

The communication controller 120 controls the first communication unit 102 and the second communication unit 104 and controls each of the communications via the first communication path and the communication via the second communication path.

Example of Control of Communication Controller 120

For example, the communication controller 120 performs the process (the communication process via the first communication path) of (B-1) by controlling the first communication unit 102.

The communication controller 120 performs the process (the process of preparing the integration of the networks on the basis of the determined roles) of (C-1), the process (the pairing process in the second communication path) of (C-2), and the process (the connection process via the second communication path) of (D-1) on the basis of the role in the communication via the second communication path controlled in the role controller 122.

For example, when the role controller 122 determines the information processing apparatus to play the role of the master of the communication via the second communication path, the information processing apparatus carries out active communication via the second communication path with an external apparatus. In this case, the information processing apparatus 100 functions as the master apparatus of the star-type network formed by the second communication path. More specifically, on the basis of the setting information received via the first communication path, the communication controller 120 carries out active communication via the second communication path with the external apparatus (another information processing apparatus 100 transmitting the information via the first communication path) so as to correspond to the setting information. Moreover, on the basis of the network organization information received via the first communication path, the communication controller 120 carries out the active communication via the second communication path with the external apparatus (another information processing apparatus 100 organizing the external network) so as to correspond to the network organization information.

Therefore, the communication controller 120 controls the communication when the role controller 122 determines the information processing apparatus to play the role of the master. In this way, it is possible to integrate the network belonging to the information processing apparatus and another network into one star-type network.

For example, when the role controller 122 determines the information processing apparatus to play the role of the slave in the communication via the second communication path, the communication controller 120 performs passive communication via the second communication path with the external apparatus receiving the information shown in FIG. 4 via the first communication path. Therefore, the communication controller 120 controls the communication when the role controller 122 determines the information processing apparatus to play the role of the slave. In this way, it is possible to integrate the network belonging to the information processing apparatus and another network into one star-type network.

By performing the above-described process by the communication controller 120, for example, it is possible to integrate the plurality of star-type networks into one star-type network.

The process related to the control performed by the communication controller 120 is not limited thereto. For example, the communication controller 120 can control the communication in the process (for example, the process shown in FIG. 11) of the second example of the communication stabilization approach before the communication via the first communication path. The communication controller 120 permits the information creator 124 to create various kinds of information, such as the information shown in FIG. 4, the information shown in FIG. 5, and the external connection list acquiring request, related to the communication stabilization approach according to the application.

The role controller 122 controls the role (for example, master/slave) which the information processing apparatus 100 plays in the communication via the second communication path. The role controller 122 determines the role which the information processing apparatus 100 plays in the communication via the second communication path, by performing the process (the role determining process) of (B-2) and the role switching process shown in FIG. 11, for example. However, the application is not limited thereto. For example, the role controller 122 may determine the role in the communication via the second communication path on the basis of an operation signal in reply to an operation of a user delivered from the operation unit 110.

The role controller 122 permits the information creator 124 to create the designation role information (for example, the BT role information shown in FIG. 4) by delivering the determined role to the information creator 124, for example. The application is not limited to the case where the role controller 122 permits the information creator 124 to create the designation role information. For example, the role controller 122 may permit the information creator 124 to create role information (not shown) representing the role in the communication via the second communication path whenever the role is determined (or the role is changed). When the role controller 122 permits the information creator 124 to create the role information, the communication controller 120 may perform control on the basis of the role information, for example.

For example, on the basis of an information creating command in the communication controller 120 or the role controller 122, the information creator 124 creates information in reply to the information creating command. Examples of the information created by the information creator 124 include the setting information regarding the information processing apparatus 100, the network organization information regarding the network to which the information processing apparatus 100 belongs, and the designation role information. However, the application is not limited thereto.

The controller 108 including the communication controller 120, the role controller 122, and the information creator 124, for example, can mainly perform the process related to the communication stabilization approach according to the above-described embodiment. The configuration of the controller 108 is not limited to the configuration shown in FIG. 18. For example, the controller 108 may include an execution unit (not shown) executing a process related to the execution of an application, such as a game using the communication via the second communication path, using the communication via the second communication path between the information processing apparatuses or an application stored in the memory unit 106.

The operation unit 110 is an operation unit included in the information processing apparatus 100 and permitting an operation of a user. The information processing apparatus 100 including the operation unit 110 can perform a desired process of the user in reply to the operation of the user by permitting the operation of the user related to the execution of the application, for example. Here, examples of the operation unit 110 include a button, a direction key, a rotational selector such as a jog dial, and a combination thereof. However, the application is not limited thereto.

The display unit 112 is a display unit of the information processing apparatus 100 and displays various kinds of information on a display screen. Examples of a screen displayed on the display screen of the display unit 112 include an execution screen of an application, a display screen showing a communication state, and an operation screen used to execute the desired operation on the information processing apparatus 100. Here, examples of the display unit 112 include an LCD or an organic EL display. However, the application is not limited thereto. For example, the display unit 112 of the information processing apparatus 100 may be formed by a touch screen. In the above case, the display unit 112 functions as an operation unit permitting operation and display of the user.

The information processing apparatus 100 having the configuration shown in FIG. 18, for example, realizes the process related to the above-described communication stabilization approach. Therefore, the information processing apparatus 100 can integrate the plurality of star-type networks into one star-type network. Therefore, it is possible to carry out more stable communication between any of information processing apparatuses organizing the integrated network, as well as the communication between the information processing apparatuses belonging to different star-type networks.

As described above, the information processing apparatus 100 according to an embodiment performs the process (the communication process via the first communication path) of (B-1) to the process (the connection process via the second communication path) of (D-1) together with another information processing apparatus 100 organizing the external network. Each of the information processing apparatuses 100 organizing the first network and each of the information processing apparatuses 100 organizing the second network perform the process related to the communication stabilization approach according to an embodiment. In this way, the first and second networks are integrated into one star-type network. Therefore, by using the information processing apparatus 100, it is possible to reduce the possibility that unintended communication failure occurs in the integrated network, compared to the case of the scatternet or the case where the technology according to the known example is used. Since the complexity of the process related to the communication is reduced in comparison to the case of the scatternet by using the information processing apparatus 100, it is possible to more easily realize an application, such as a game using the communication via the second communication path, using the communication via the second communication path between the information processing apparatuses. The information processing apparatus 100 can integrate the plurality of star-type networks into one star-type network. Therefore, it is possible to carry out more stable communication between any of the information processing apparatuses organizing the integrated network, as well as the communication between the information processing apparatuses belonging to different star-type networks.

The information processing apparatuses 100 organizing the first network and the information processing apparatuses 100 organizing the second network make it possible to carry out the communication via the second communication path by transmitting and receiving the information shown in FIG. 4, for example, via the first communication path formed by NFC. That is, by using the information processing apparatus 100, the integration of the networks is realized just in the way in which the user approaches the information processing information 100 owned by the user with respect to another information processing apparatus 100 up to the range in which the communication via the first communication path can be carried out with another information processing apparatus 100, for example.

More specifically, by using the above-described information processing apparatus 100, it is possible to realize one star-type network formed by integrating the plurality of star-type networks. Therefore, when an application using the communication via the second communication path between the information processing apparatuses is a game using the communication via the second communication path, it is possible to match role allotment (application layer) of the game with role allotment of a physical layer of the network in each information processing apparatus 100. Therefore, since control of transmitting and receiving packets in the network is simplified, it is possible to easily realize the game using the communication via the second communication path and stabilize the communication by using the information processing apparatus 100.

The information processing apparatus 100 according to an embodiment has been described, but the present application is not limited to the above-described embodiment. An embodiment is applicable to various apparatuses such as a computer such as a PC and a PDA (Personal Digital Assistant), a portable communication apparatus such as a cellular phone and a PHS (Personal Handyphone system), a video/music reproducing apparatus, a video/music recording and reproducing apparatus, and a portable game console.

Recording Medium Recording Computer Readable Program Related to Information Processing Apparatus According to Embodiment The plurality of star-type networks can be integrated into one star-type network by a program causing a computer to function as the information processing apparatus according to an embodiment. Therefore, it is possible to carry out more stable communication between any of the information processing apparatuses organizing the integrated network, as well as the communication between the information processing apparatuses belonging to different star-type networks.

Embodiments have been described with reference to the accompanying drawings, but the present application is not limited thereto.

For example, the program has been provided to cause the computer to function as the information processing apparatus according to the embodiment. However, according to the embodiment, a recording medium recording the program may be provided also.

The above configuration is just an example of an embodiment of the present application.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A communication method between a first network, which is organized by a plurality of information processing apparatuses each including a first communication unit carrying out non-contact type communication with an external apparatus via a first communication path using carder waves with a predetermined frequency and a second communication unit carrying out communication with an external apparatus via a second communication path different from the first communication path, and in which one information processing apparatus of the plurality of information processing apparatuses serves as a first master apparatus playing a role of a master in the communication via the second communication path and the other information processing apparatuses serve as first slave apparatuses playing a role of a slave, and a second network having the same configuration as that of the first network, the communication method comprising:

a first transmission step of transmitting from the first master apparatus, via the first communication path using the carrier waves with the predetermined frequency, (i) first setting information used for the external apparatus to make a connection to the second communication path, which uses a different frequency range than the first communication path, and carry out the communication with the first master apparatus via the second communication path and (ii) first network organization information regarding the organization of the first network from the first master apparatus of the first network to one information processing apparatus of the second network;

a first determination step of determining a role of the communication with the first master apparatus via the second communication path by the second master apparatus on the basis of the received first network organization information and role adjustment information used to determine the role of the communication via the second communication path, when the information processing apparatus receiving the first setting information and the first network organization information transmitted in the first transmission step is a second master apparatus playing a role of a master in the second network;

a second transmission step of transmitting from the second master apparatus, via the first communication path using the carrier waves with the predetermined frequency, (i) second setting information used for the external apparatus to make a connection to the second communication path, which uses a different frequency range than the first communication path, and carry out the communication with the second master apparatus via the second communication path and (ii) second network organization information regarding the organization of the second network from the second master apparatus to the first master apparatus;

a second determination step of determining a role of the communication with the second master apparatus via the second communication path by the first master apparatus on the basis of the received second network organization information and role adjustment information used to determine the role of the communication via the second communication path; and a first communication start step of starting the communication via the second communication path by one information processing apparatus of the first and second master apparatuses determined to play the role of the master in the first or second determination step with another information processing apparatus organizing the network, to which the other information processing apparatus determined to play the role of the slave in the first or second determination step belongs, on the basis of the first setting information and the first network organization information or on the basis of the second setting information and the second network organization information.

2. The communication method according to claim 1, further comprising: a first disconnection step of disconnecting the communication via the second communication path with the slave apparatuses organizing the network, to which the other information processing apparatus determined to play the role of the slave in the first or second determination step belongs, by the other information processing apparatus.

3. The communication method according to claim 2, further comprising: a third transmission step of transmitting third setting information, which is used for an external apparatus to carry out the communication via the second communication path with a second slave apparatus playing the role of the slave in the second network and receiving the first setting information and the first network organization information, and third network organization information, which includes notification information indicating transmission of an external connection list including setting information used to carry out the communication via the second communication path with the information processing apparatuses organizing the second network other than the second slave apparatus receiving the first setting information and the first network organization information, via the first communication path, when the information processing apparatus receiving the first setting information and the first network organization information transmitted in the first transmission step is the second slave apparatus;

a first acquiring request transmission step of transmitting an acquiring request requesting transmission of the external connection list from the second slave apparatus receiving the first setting information and the first network organization information to the second master apparatus via the second communication path;

a fourth transmission step of transmitting the external connection list in reply to the acquired request from the second master apparatus to the second slave apparatus transmitting the acquiring request via the second communication path on the basis of the acquiring request transmitted in the first acquiring request transmission step;

a fifth transmission step of transmitting the external connection list acquired from the second master apparatus in the first acquiring request transmission step from the second slave apparatus to the first master apparatus via the second communication path; and a second communication start step of starting the communication via the second communication path with the information processing apparatuses organizing the second network by the first master apparatus on the basis of the third setting information transmitted in the third transmission step and the external connection list transmitted in the fifth transmission step.

4. The communication method according to claim 3, further comprising:

a role switch step of switching the roles of the master apparatus and the slave apparatus among the plurality of the information processing apparatuses organizing the first network, wherein the master transmitting the first setting information and the first network organization information via the first communication path in the first transmission step is the information processing apparatus of which the role is switched in the role switch step.

5. The communication method according to claim 4, wherein the role switch step includes:

a second acquiring request transmission step of transmitting an acquiring request requesting transmission of an external connection list including setting information used to carry out communication with the information processing apparatuses organizing the first network other than the first slave apparatus from one slave apparatus playing the role of the slave among the information processing apparatuses organizing the first network to the master apparatus playing the role of the master in the first network via the second communication path;

a sixth transmission step of transmitting the external connection list in reply to the acquiring request from the master apparatus to the first slave apparatus transmitting the acquiring request via the second communication path on the basis of the acquiring request transmitted in the second acquiring request transmission step;

a second disconnection step of disconnecting the communication via the second communication path with the slave apparatuses organizing the first network other than the first slave apparatus transmitting the acquiring request by the master apparatus transmitting the external connection list in the sixth transmission step; and a role switch step of switching the role of the first slave apparatus transmitting the acquiring request to the role of the master and switching the role of the master disconnecting the communication in the second disconnection step to the role of the slave.

6. The communication method according to claim 3, wherein the third network information includes a header representing a kind of information, designation role information representing a requested role in the communication via the second communication path, and the notification information.

7. The communication method according to claim 1, further comprising:
 an acquiring request transmission step of transmitting an acquiring request, which requests transmission of an external connection list including setting information used to carry out communication with the information processing apparatuses organizing the second network other than a second slave apparatus playing the role of the slave of the second network and receiving the first setting information and the first network organization information, from the second slave apparatus receiving the first setting information and the first network organization information to the second master apparatus via the second communication path, when the information processing apparatus receiving the first setting information and the first network organization information transmitted in the first transmission step is the second slave apparatus playing the role of the slave in the second network;
 a seventh transmission step of transmitting the external connection list in reply to the acquiring request from the second master apparatus to the second slave apparatus transmitting the acquiring request via the second communication path on the basis of the acquiring request transmitted in the acquiring request transmission step;
 an eighth transmission step of transmitting second network organization information, which includes the external connection list acquired from the second master apparatus in the acquiring request transmission step, and third setting information, which is used for an external apparatus to carry out communication with the second slave apparatus receiving the first setting information and the first network organization information via the second communication path, from the second slave apparatus receiving the first setting information and the first network organization information transmitted in the first transmission step to the first master apparatus via the second communication path; and
 a third communication start step of starting the communication via the second communication path with the information processing apparatuses organizing the second network by the first master apparatus receiving the third setting information and the second network organization information transmitted in the eight transmission step on the basis of the received third setting information and second network organization information.

8. The communication method according to claim 7, further comprising:
 a disconnection step of disconnecting the communication via the second communication path with the slave apparatuses organizing the second network by the second master apparatus transmitting the external connection list in the seventh transmission step.

9. The communication method according to claim 1, wherein the first network organization information and the second network organization information each include a header representing a kind of information, designation role information representing a requested role in the communication via the second communication path, and an external connection list including setting information used for an external apparatus to carry out communication with the information processing apparatuses organizing the network other than the information processing apparatus transmitting the first network organization information or the second network organization information.

10. The communication method according to claim 9, wherein the external connection list further includes authentication information used for authentication upon carrying out communication with the information processing apparatuses organizing the first network or the information processing apparatuses organizing the second network.

11. The communication method according to claim 10, wherein the authentication information is unique information of the first and second networks or unique information of each of the information processing apparatuses organizing the first network and each of the information processing apparatuses organizing the second network.

* * * * *